United States Patent
Kedalagudde et al.

(10) Patent No.: US 11,877,235 B2
(45) Date of Patent: Jan. 16, 2024

(54) DEVICE FOR AND METHOD OF RADIO ACCESS TECHNOLOGY SELECTION AMONG MULTIPLE RADIO ACCESS TECHNOLOGIES

(71) Applicant: Apple Inc., Cupertino, CA (US)

(72) Inventors: Meghashree Dattatri Kedalagudde, Hillsboro, OR (US); Ana Lucia Pinheiro, Portland, OR (US); Ranganadh Karella, San Diego, CA (US); Vivek Gupta, San Jose, CA (US); Dave A. Cavalcanti, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/893,951

(22) Filed: Aug. 23, 2022

(65) Prior Publication Data

US 2022/0408354 A1    Dec. 22, 2022

Related U.S. Application Data

(62) Division of application No. 16/310,407, filed as application No. PCT/US2017/038763 on Jun. 22, 2017.

(Continued)

(51) Int. Cl.
  *H04W 48/18* (2009.01)
  *G08G 1/00* (2006.01)
  (Continued)

(52) U.S. Cl.
  CPC .............. *H04W 48/18* (2013.01); *G08G 1/22* (2013.01); *H04L 43/0841* (2013.01); *H04W 4/44* (2018.02); *H04W 4/46* (2018.02)

(58) Field of Classification Search
  None
  See application file for complete search history.

(56) References Cited

U.S. PATENT DOCUMENTS 9,031,508 B2    5/2015    Kwon et al.
9,544,841 B2    1/2017    Cui et al.
(Continued)

FOREIGN PATENT DOCUMENTS

JP    2003331389    11/2003

OTHER PUBLICATIONS

"Further discussion on V2X scenarios", R2-162944, 3GPF TSGRAN WG2 #93bis Duhrovnik Croatia, (Apr. 2, 2016), 2-3.

(Continued)

*Primary Examiner* — Gregory B Sefcheck
(74) *Attorney, Agent, or Firm* — Kowert, Hood, Munyon, Rankin & Goetzel, P.C.

(57) ABSTRACT

Systems and methods of providing a V2X communications are generally described. A geographically-limited, operator-independent mapping table is used that maps between groups of V2X applications each associated with a different application category and a different RAT preferred for the V2X application category. Each grouping is based on fulfillment of one or more KPIs for the associated V2X application category. Multiple RATs are prioritized if able to fulfill the KPIs. The mapping table is modified based on the RATs supported by the V2X UE. Carrier aggregation is used when simultaneous transmission on different RATs is desired.

20 Claims, 13 Drawing Sheets

Related U.S. Application Data

(60) Provisional application No. 62/372,498, filed on Aug. 9, 2016, provisional application No. 62/366,925, filed on Jul. 26, 2016.

(51) Int. Cl.
*H04W 4/46* (2018.01)
*H04L 43/0829* (2022.01)
*H04W 4/44* (2018.01)

(56) References Cited

U.S. PATENT DOCUMENTS

| | | | |
|---|---|---|---|
| 9,743,440 | B2 | 8/2017 | Wietfeldt et al. |
| 9,794,870 | B2 | 10/2017 | Vannithamby et al. |
| 9,832,798 | B2 | 11/2017 | Kwon et al. |
| 10,117,212 | B2 | 10/2018 | Rune et al. |
| 10,231,157 | B2 | 3/2019 | Jung et al. |
| 10,278,123 | B2 | 4/2019 | Wang et al. |
| 10,554,708 | B2 | 2/2020 | Wu et al. |
| 10,708,734 | B2 | 7/2020 | Cavalcanti et al. |
| 10,827,502 | B2 | 11/2020 | Basu Mallick et al. |
| 2011/0093136 | A1 | 4/2011 | Moinzadeh et al. |
| 2012/0002545 | A1* | 1/2012 | Watfa ............... H04W 48/06 370/328 |
| 2012/0014381 | A1 | 1/2012 | Dwyer et al. |
| 2013/0201847 | A1 | 8/2013 | Chincholi et al. |
| 2014/0136658 | A1* | 5/2014 | Wahler ............ H04B 7/18508 709/218 |
| 2014/0211749 | A1 | 7/2014 | Sakata |
| 2015/0169018 | A1 | 6/2015 | Rogoe et al. |
| 2016/0007257 | A1* | 1/2016 | Kim ................ H04W 36/14 370/331 |
| 2016/0295624 | A1 | 10/2016 | Novlan et al. |
| 2017/0280378 | A1* | 9/2017 | Atarius ............. H04W 48/16 |
| 2017/0288886 | A1* | 10/2017 | Atarius ............. H04L 47/20 |
| 2018/0014247 | A1 | 1/2018 | Chandramouli et al. |
| 2018/0020386 | A1* | 1/2018 | Chandramouli .. H04W 36/0027 |
| 2018/0035276 | A1 | 2/2018 | Kang et al. |
| 2018/0049088 | A1* | 2/2018 | Shiga ................. H04W 4/44 |
| 2018/0159935 | A1* | 6/2018 | Cavalcanti .......... H04W 4/40 |
| 2018/0167913 | A1* | 6/2018 | Ying ................. H04W 12/06 |
| 2018/0176858 | A1* | 6/2018 | Wang ................ H04W 48/18 |
| 2018/0192268 | A1* | 7/2018 | Xu ..................... H04W 76/10 |
| 2018/0206089 | A1* | 7/2018 | Cavalcanti ......... H04W 48/16 |
| 2018/0213376 | A1* | 7/2018 | Pinheiro ............ H04W 72/30 |
| 2019/0028897 | A1* | 1/2019 | Ying .................. H04L 67/12 |
| 2019/0082352 | A1* | 3/2019 | Hua .................. H04W 28/06 |
| 2019/0104530 | A1* | 4/2019 | Deng ................ H04W 8/245 |
| 2019/0110175 | A1* | 4/2019 | Chun ................ H04W 28/06 |
| 2019/0116609 | A1 | 4/2019 | Feng et al. |
| 2019/0124489 | A1* | 4/2019 | Ahmad ............... H04W 4/70 |
| 2019/0132717 | A1* | 5/2019 | Xu .................... H04W 48/20 |
| 2019/0150046 | A1* | 5/2019 | Shiga ................. H04W 4/02 370/331 |
| 2019/0158489 | A1* | 5/2019 | Ben Henda ......... H04W 12/069 |
| 2019/0174344 | A1* | 6/2019 | Karella .............. H04W 24/10 |
| 2019/0200228 | A1* | 6/2019 | Adrangi ............ H04L 9/3268 |
| 2019/0289462 | A1* | 9/2019 | Kim ................. H04W 12/0433 |
| 2019/0313375 | A1 | 10/2019 | Loehr et al. |
| 2020/0084738 | A1 | 3/2020 | Nguyen |
| 2021/0185504 | A1* | 6/2021 | Wong ................. H04W 4/40 |
| 2022/0377549 | A9* | 11/2022 | Cavalcanti ........... H04W 12/08 |

OTHER PUBLICATIONS

"International Application Serial No. PCT/US2017/038763, International Search Report dated Oct. 17, 2017", 7 pgs.

"International Application Serial No. PCT/US2017/038763, Invitation to Pay Add'l Fees and Partial Search Rpt dated Aug. 4, 2017", 7 pgs.

"International Application Serial No. PCT/US2017/038763, Written Opinion dated Oct. 17, 2017", 5 pgs.

\* cited by examiner

DEVICE FOR AND METHOD OF RADIO ACCESS TECHNOLOGY SELECTION AMONG MULTIPLE RADIO ACCESS TECHNOLOGIES

PRIORITY CLAIM

This application is a Divisional of U.S. patent application Ser. No. 16/310,407, filed Dec. 14, 2018, which is a U.S. National Stage Filing under 35 U.S.C. 371 from International Application No. PCT/US2017/038763, filed Jun. 22, 2017 and published in English as WO 2018/022225 on Feb. 1, 2018, which claims the benefit of priority to U.S. Provisional Patent Application Ser. No. 62/366,925, filed Jul. 26, 2016, entitled "METHOD TO SUPPORT SELECTION OF RAT IN THE PRESENCE OF MULTIPLE RATS," and U.S. Provisional Patent Application Ser. No. 62/372,498, filed Aug. 9, 2016, entitled "CHOICE OF RAT," each of which is incorporated herein by reference in its entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to radio access networks. Some embodiments relate to vehicle-to-everything (V2X) communications in various radio access technologies (RATs) including cellular and wireless local area network (VLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

The use of 3GPP LTE systems (including both LTE and LTE-A systems) has increased due to both an increase in the types of devices user equipment (UEs) using network resources as well as the amount of data and bandwidth being used by various applications, such as video streaming, operating on these UEs. For example, the growth of network use by Internet of Things (IoT) UEs, which include machine type communication (MTC) devices such as sensors and may use machine-to-machine (M2M) communications, as well as the burgeoning V2X communications, has severely strained network resources and increased communication complexity. V2X communications of a variety of different applications from a user equipment (UE) are to coordinate with various technologies, as well as among potentially rapidly moving vehicles.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
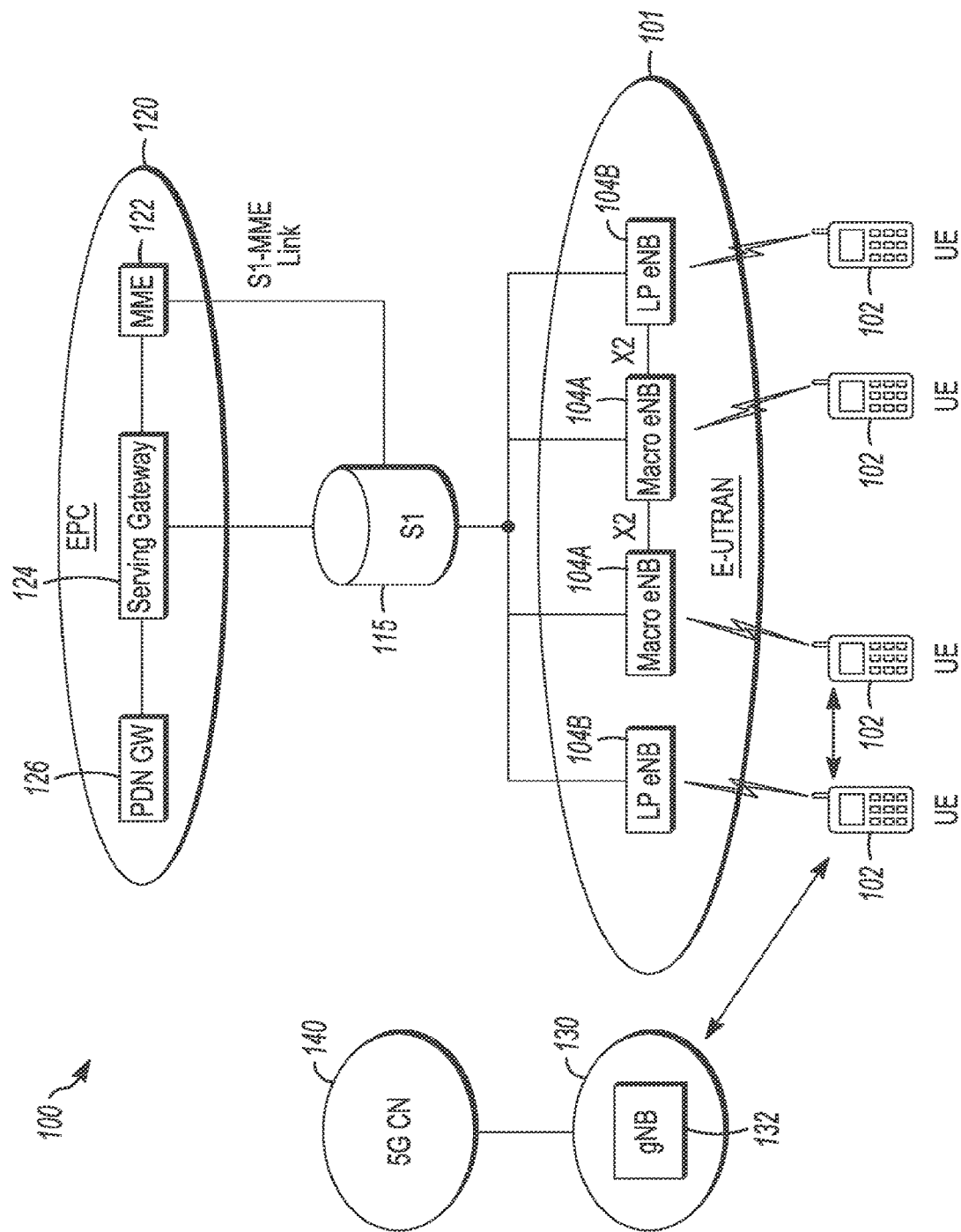
FIG. 1A shows an example of a network architecture in accordance with some embodiments.

FIG. 1A shows an example of a network architecture in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example. In addition to the RAN 101, the network 100 may include one or more 5G RAN 130 each containing one or more standalone gNBs 132 and connected to a 5G core network 140.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs 104a and low power (LP) eNBs 104b. Other elements, such as a Home Location Register (HLR)/Home Subscriber Server (HSS), a database including subscriber information of a 3GPP network that may perform configuration storage, identity management and user state storage, and a Policy and Charging Rule Function (PCRF) that performs policy decision for dynamically applying Quality of Service (QoS) and charging policy per service flow, are not shown for convenience. In some embodiments, the eNBs 104 may act as dual mode eNBs, providing LTE/4G and 5G service to the UEs 102. In some embodiments, the 5G RAN 130 may be a booster cell that is connected to an anchor RAN 101.

The MME 122 may be similar in function to the control plane of legacy Serving GPRS Support Nodes (SGSN) The MME 122 may manage mobility aspects in access such as gateway selection and tracking area list management, performing both mobility management (MM) and session management (SM). The Non-Access Stratum (NAS) is a part of the control plane between a UE 102 and the MME 122. The NAS is used for signaling between the UE 102 and the EPC in the LTE/UMTS protocol stack. The NAS supports UE mobility and session management for establishing and maintaining an IP connection between the UE 102 and PDN GW 126.

The serving GW 124 may terminate the user plane interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and policy enforcement, packet routing, idle mode packet buffering, and triggering an MME to page a UE. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN, and may perform policy enforcement and charging data collection UE IP address assignment, packet screening and filtering. The PDN GW 126 may also provide an anchor point for mobility devices with a non-LTE access. The external PDN can be any kind of IP network, as well as an IP Multimedia Subsystem (IMS) domain. The PDN GW 126 and the serving GW 124 may be implemented in a single physical node or separate physical nodes. In some embodiments, the 5G CN 140 may be connected with the EPC 120 through a S6a interface to an HISS of the EPC 120, and may or may not, in some embodiments, be connected through the PDN GW 126.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers. The UEs 102 may communicate with the RAN 101, the 5G RAN 130 and/or with each other (device-to-device (D2D) communication) via e.g., a Dedicated Short-Range Communications (DSRC) link. The DSRC standards suite is based on multiple cooperating standards that have been mainly developed by the IEEE and are based on the IEEE 802.11 standard.

The S1 interface 115 may be the interface that separates the RAN 101 and the EPC 120. It may be split into two parts the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage or a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB. In some embodiments, when the LP eNB 104b is a Home eNB (HeNB), a HeNB Gateway may be provided between the HeNB and the MME/Serice Gateway. This HeNB Gateway may control multiple HeNBs and provide user data and signal traffic from the HeNBs towards the MME/Service Gateway. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality and/or connect via an S1 interface to an MME/Service Gateway. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

Figure 1B:
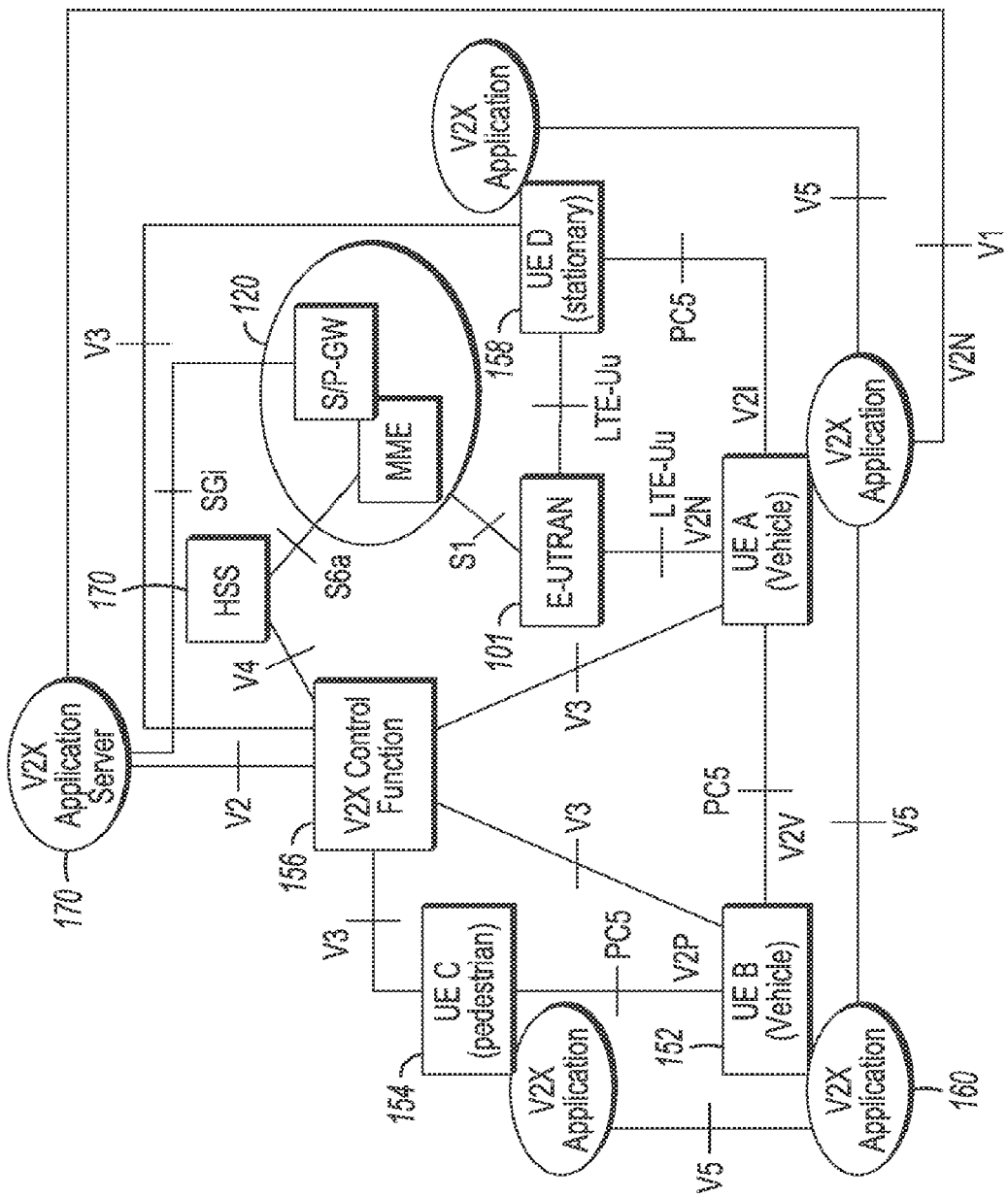
FIG. 1B shows an example of a V2X architecture in accordance with some embodiments.

In some embodiments, the UE 102 may be a V2X UE that runs V2X applications and communicates via V2X communications. FIG. 1B shows an example of a V2X architecture in accordance with some embodiments. V2X communications may contain four types: Vehicle-to-Vehicle (V2V), Vehicle-to-Infrastructure (V2I), Vehicle-to-Network (V2N) and Vehicle-to-Pedestrian (V2P) over a PC5 reference point PC5 reference point may be used for the communication of V2X messages. The V2X applications may communicate with other vehicle-based V2X applications (V2V communications), V2I communications may involve communications with a Road Side Unit (RSU) and V2N communications may involve communications with an eNB (or E-UTRAN 101). Each UE may be associated with a V2X application 160 disposed at the UE.

V2V and V2P transmission may be based on primarily broadcast capability between vehicles or between vehicles and vulnerable road users (e.g., pedestrian, cyclist). The transmissions may, for example, provide information about location, velocity and direction, which may be used to avoid accidents. V2I transmission may be provided between a vehicle and UE D (RSU) 158. V2N transmission may be between a vehicle and a V2X application server 170. The V2X Application Server may be able to support multiple V2X applications. An RSU 158 may be used to extend the range of a V2X message received from a vehicle (shown in FIG. 1B as LE A) by acting as a forwarding node (e.g., repeater). V2I may include communication between vehicles and traffic control devices, such as in the vicinity of road work. V2N may also include communication between vehicle and the server 170 via the 4G/5G network, such as for traffic operations.

The communications shown in FIG. 1B may be generally bidirectional, e.g., V2I and V2N also involve the infrastructure sending messages to the vehicles, such as UE B 152. The UE 152 may obtain authorization to use V2X communications over the PC5 reference point on a per public land mobile network (PLMN) basis in the serving PLMN by a V2X Control Function 156 in the Home PLMN (H PLMN) through a V3 reference point. The V2X Control Function 156 may be connected with the HSS 170 over a V4 interface. The HSS 170 may be connected with the EPC 120. The V2X Control Function 156 may request authorization information from a V2X Control Function of the serving PLMN. The V2X Control Function 156 in the HPLMN may combine authorization information from the home and serving PLMNs. Authorization may be revoked at any point by either V2X Control Function. The V2X Control Function 156 may communicate the combined authorization information to the UE and/or revocation.

The PC5 reference point may be used to provision the UE with various pieces of information for V2X communications. This information may include the authorization policy, radio parameters and policy/parameters for V2X communication. The authorization policy may indicate PLMNs in which the UE is authorized to perform V2X communications over the PC5 reference point when served by the E-UTRAN 101 and otherwise whether the UE is authorized to perform V2X communications over the PC5 reference point (i e, when not served by the E-UTRAN 101). The radio parameters may include those in a particular geographical area to be configured in the UE to be able perform V2X communications over the PC5 reference point when not served by F-UTRAN. The policy/parameters may include the mapping of Destination Layer-2 ID(s) and the V2X services, e.g. PSID or ITS-AIDs of the V2X application, as well as the mapping of ProSe per-packet priority and delay budget for V2X communication. Additional information may be provisioned to the UE regarding V2X communications over the LTE-Uu reference point between the UE and the E-UTRAN.

As above, V2X communication may occur over the PC5 reference point. The V2X communication may support roaming and inter-PLMN operations. V2X communication over PC5 reference point may be supported whether or not the UE is served by E-UTRAN V2X communication over the PC5 reference point may be user-plane communications rather than control-plane communications. Both IP based and non-IP based may be supported. The LTE-Uu reference point may also be used for the transmission and reception of unicast and broadcast (MBMS) V2X messages.

Figure 2:
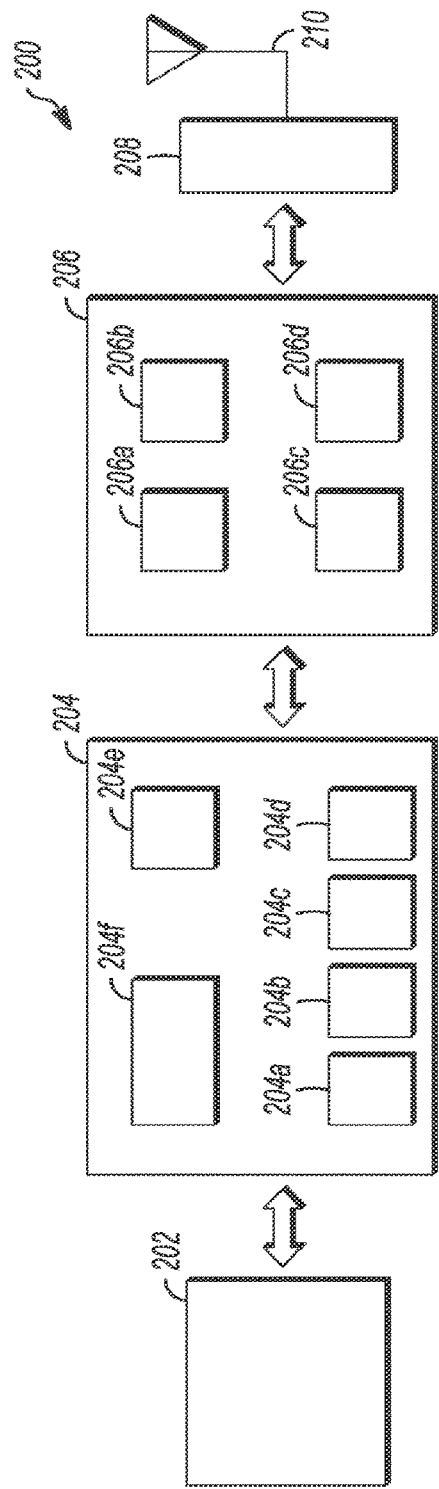
FIG. 2 illustrates components of a communication device in accordance with some embodiments.

FIG. 2 illustrates components of a communication device in accordance with some embodiments. The communication device 200 may be a UE, eNB or other network component as described herein. The communication device 200 may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the MME may contain some or all of the components shown in FIG. 2.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.) The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204$a$, third generation (3G) baseband processor 204$b$, fourth generation (4G) baseband processor 204$c$, and/or other baseband processor(s) 204$d$ for other existing generations, generations in development or to be developed in the future (e.g., fifth generation (5G), 5G, etc.). The baseband circuitry 204 (e.g., one or more of baseband processors 204$a$-$d$) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an Evolved UTRAN (EUTRAN) protocol including, for example, physical (PHY), media access control (MAC), radio link control (RLC), packet data convergence protocol (PDCP), radio resource control (RRC) elements, and/or Non-Access Stratum (NAS) elements. A central processing unit (CPU) 204e of the baseband circuitry 204 may be configured to run elements of the protocol stack for signaling of the PHY, MAC, RLC, PDCP and/or RRC layers, and/or NAS. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an EUTRAN and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS). UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-convenned signals to generate output baseband signals. Output baseband signals may be provided to the baseband circuitry 204 for further processing. In some embodiments, the output baseband signals may be zero-frequency baseband signals, although this is not a requirement In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input in some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA) In some embodiments, the DMD may be configured to divide the input signal by either N or N+1 (e.g., based on a carry out) to provide a fractional division ratio In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path, the receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the communication device 200 may include additional elements such as, for example, memory/storage, display, camera, sensor, and/or input/output (I/O) interface as described in more detail below. In some embodiments, the communication device 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the communication device 200 may include one or more user interfaces designed to enable user interaction with the system and/or peripheral component interfaces designed to enable peripheral component interaction with the system. For example, the communication device 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals In some multiple-input multiple-output (MIMO) embodiments, the antennas 210 may be effectively separated to take advantage of spatial diversity and the different channel characteristics that may result.

Although the communication device 20M is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors. DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
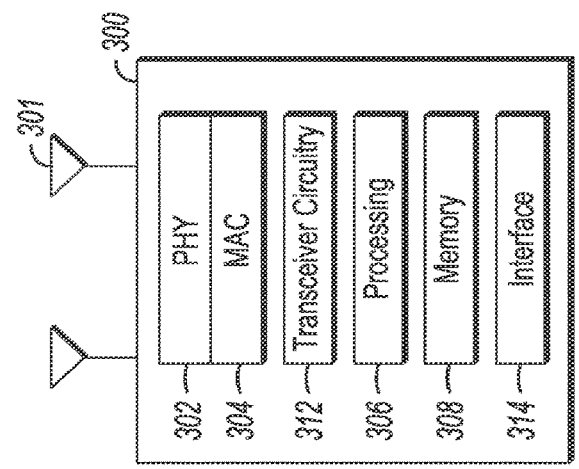
FIG. 3 illustrates a block diagram of a communication device in accordance with some embodiments.

FIG. 3 is a block diagram of a communication device in accordance with some embodiments. The device may be a UE, for example, such as the UE shown in FIG. 1. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, WiGig, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
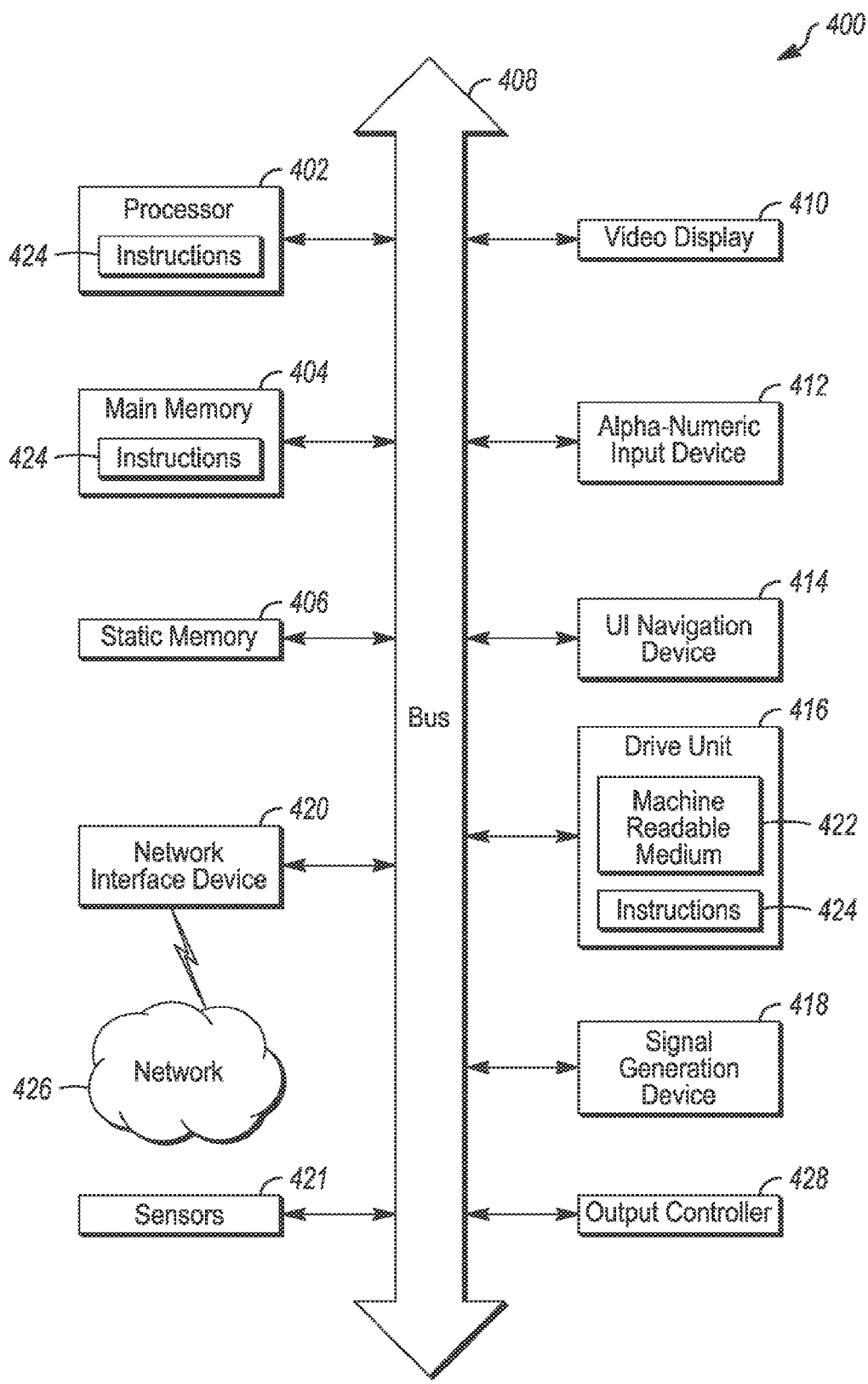
FIG. 4 illustrates another block diagram of a communication device in accordance with some embodiments.

FIG. 4 illustrates another block diagram of a communication device in accordance with some embodiments in alternative embodiments, the communication device 400 may operate as a standalone device or may be connected (e.g., networked) to other communication devices. In a networked deployment, the communication device 400 may operate in the capacity of a server communication device, a client communication device, or both in server-client network environments In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smart phone, a web appliance, a network router, switch or bridge, or any communication device capable of executing instructions (sequential or otherwise) that specify, actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks, Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.) Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as WiFi®, IEEE 802.16 family of standards known as WiMax®), IEEE 802.15.4 family of standards, a LTE family of standards, a UMTS family of standards, peer-to-peer (P2P) networks, among others In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As described above, vehicle UEs may engage in V2X communications. V2X communications may be part of the next generation networks that are to be designed to take into account the massive influx of low-data, high-delay and low power transmissions. Like other types of communications, there may be multiple radio access technologies (RAT) available for communications by V2X UEs. V2X UEs may be equipped with a range of multiple access technologies for V2X communications, such as DSRC (direct Prose communication between V2X UEs). LTE, and 5G (also called new radio (NR)) (network-mediated communication between V2X UEs), among others. The issues with interoperability may be exacerbated by the fact that a V2X UE may be equipped with the modules that permit some or all of the RATs to be used, which may be dependent on the choice of operator Thus, for some RATs, not all of the V2X UEs may be able communicate.

LTE may target the same use cases and key performance indicators (KPIs) as DSRC, and 5G may target even lower latencies and can cover even more use cases. Examples of the parameters used for the KPIs, such as latency, are described below. The latency, for example, may vary depending on the applications supported by a given V2X UE. In one example, platooning applications are able to be provided through 5G communications but not LTE communications due to latency requirements of such applications, which may be less than 3 is. Some embodiments disclosed herein provide the mapping of applications with similar requirements (latency and others such as data rate) into a V2X application category that can be associated with a preferred RAT. For interoperability purposes, the mapping may be operator-independent within a predetermined area. Use of such a mapping may enable the V2X UE to manage and support applications based on the radio access coverage available in the given area. For example, a V2X UE can support safety applications with a first latency on a LTE RAT and safety applications with a second latency that is less than that of the first latency on a 5G RAT This may also be extended to support RAT choice for non-safety applications.

Various embodiments disclosed herein may provide different use cases for different KPIs Not all use cases may be supported by LTE or DSRC. Depending on the use case, different technology may be used to avoid vehicular or communication collision. A set of use cases containing one or more use cases may be supported by a particular application. The particular application may be identified by an application identifier (AppID) in LTE communications or a provider service identifier (PSID) in V2X communications. In various embodiments, the applications may be mapped into application categories and the network may configure the UE to map each application category into the preferred technologies. A mapping table may be used to support RAT selection based on an AppID or PSID The mapping table may be derived based on what the UE may decide to choose to carry out the data transmission on for a given application on a specific RAT. In some embodiments, the mapping table is used not for load balancing among the RATs (load-independent), but for interoperability; the mapping table in some embodiments thus provides interoperability among the V2X UEs without regard to (free from) load balancing among the RATs.

Figure 5:
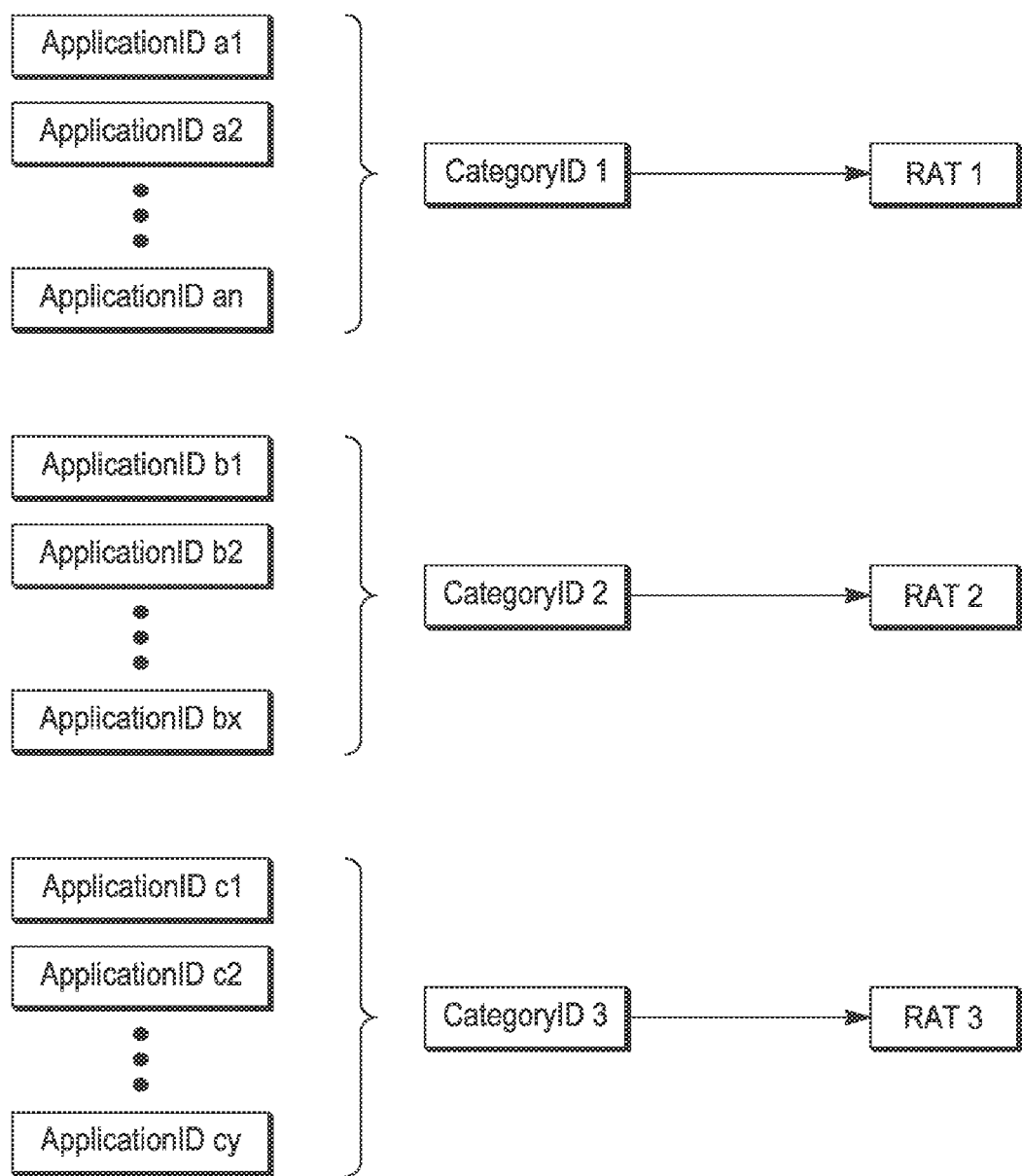
FIG. 5 illustrates a mapping in accordance with some embodiments.

FIG. 5 illustrates a mapping in accordance with some embodiments. The mapping shown in FIG. 5 may be stored in a memory of the eNB or gNB and provided to the V2X UE, where the mapping may be stored in a local memory. In some embodiments, the mapping may be of V2X applicationID (PSID or AppID, as agreed by the operators) to RAT. As shown in FIG. 5, groups of applications each having an applicationID (e.g., ApplicationIDa1 .... ApplicationIDan), may be mapped to different categories, each with a V2X category identifier (e.g., category ID1). Each group may represent a set of V2X applications with similar requirements, such as maximum latency. Each category (category ID1 . . . category ID n) may be associated with a particular RAT that can fulfill the requirements for the given category. The different RATs may be LTE, 5G or DSRC, for example.

In some embodiments, the category requirement may be fulfilled by multiple RATs. In this case, an additional RAT priority may be assigned to each of the RATs that are able to fulfill the category requirement. In the absence of a high priority RAT coverage assigned to an V2X application, the next (lower priority) RAT may be chosen for data transmission.

Additionally, certain V2X applications may use parallel reception or multi-RAT transmission. In this case, if the RATs are available, a carrier Aggregation (CA) mechanism may be used to simultaneously transmit/receive V2X data from different RATs. CA mechanisms may be available in some of the RATs such as LTE-5G CA or LTE-DSRC CA. The CA mechanism may be used in cases such as when a multi-mode V2X UE is unable to switch RATs, e.g., due to on-going activity in the current RAT. CA may be used for transmission to different RSUs, for example.

Figure 6A:
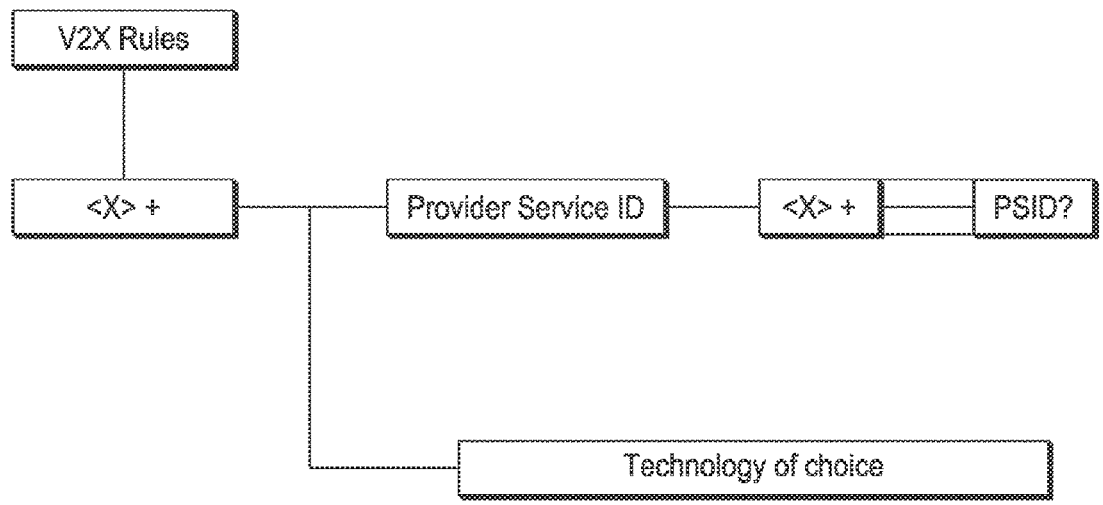
FIGS. 6A and 6B illustrate Radio Access Technology (RAT) selection via a management object (MO) in accordance with some embodiments.
Figure 6B:
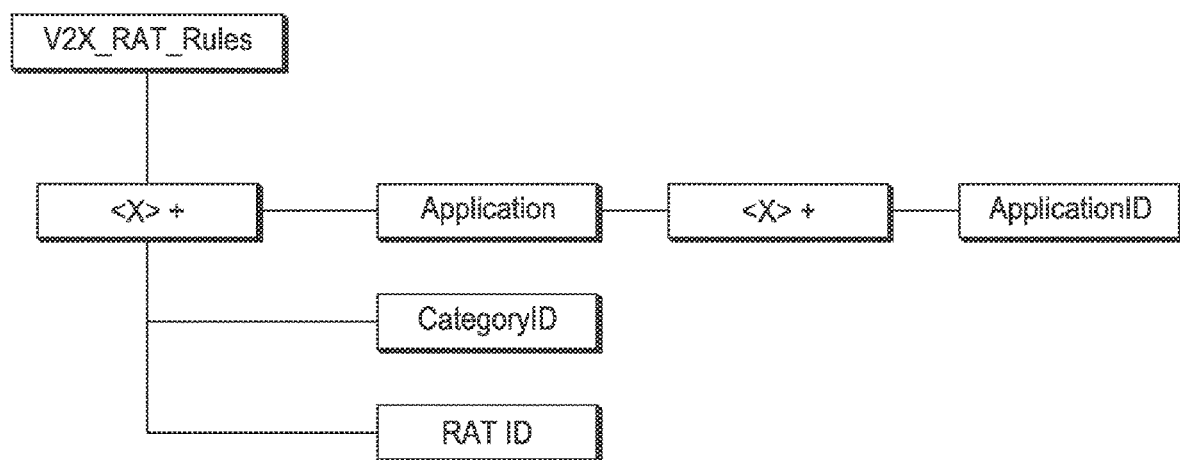

FIGS. 6A and 6B illustrate Radio Access Technology (RAT) selection via a management object (MO) in accordance with some embodiments. The MO may be part of the open mobile alliance (OMA)-device management (DM) and in general describe management information about an application or device parameter and be located in a management tree. The MO may be presented, as shown, in a hierarchical format, similar to a file system. In this context, MOs generally refer to the software constructs or data structures (e.g., in object-oriented programming settings). The OMA MO may be a newly designed management object that is primarily intended for RAT selection purposes or may be a modified version of an existing management object. As shown in FIG. 6A, the MO that defines the V2X rules may include a set of parameters (indicated by MO node <x>) of a Provider Service ID (a leaf node) and technology of choice. As shown in FIG. 6A, the Provider Service ID has an additional leaf node (value PSID?) instantiated for selection of the technology. FIG. 6B shows a detailed description of the MO that defines, as indicated in FIG. 5, an application, category ID and RAT ID. The application leaf node has an applicationID leaf node instantiated. Note that FIGS. 6A and 6B illustrate the tree structure of the MO code for the mapping table stored in the memory.

Figure 7:
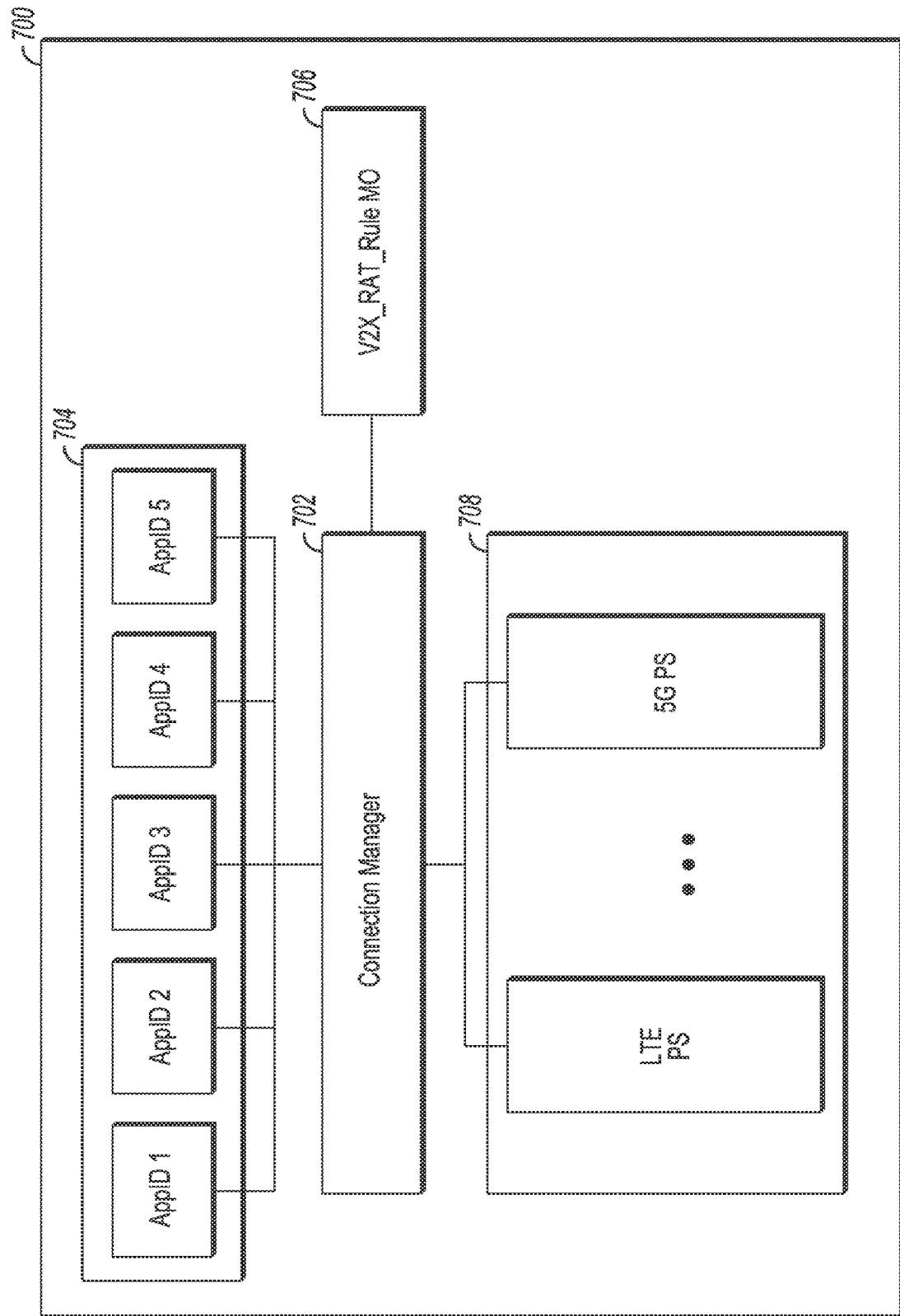
FIG. 7 illustrates a system that uses the V2X rule in accordance with some embodiments.

Each UE that supports V2X services may support a mapping table. The UE may acquire the mapping table to enable RAT choice for V2X applications in one or more ways: by OMA-DM or by initial authorization. FIG. 7 illustrates a system that uses the V2X rule accordance with some embodiments. The system 700 may contain a connection manager 702 that may receive a request for a connection from one or more of a plurality of applications 704. The connection manager 702 may determine based on the V2X Rule MO 706 and the available RATs, which RAT may be suitable to provide the service. The connection manager 702 may then, after determining the appropriate RAT, provide connectivity through the appropriate RAT PS module 708 or network interface.

The V2X UE may choose to transmit data or control signals for a given application over the appropriate RAT based upon the mapping information configured in the V2X UE. When a new application is registered with a V2X UE, the connection manager 702 may group the new application into a V2X category as described in the V2X RAT Rule MO 706.

Figure 8:
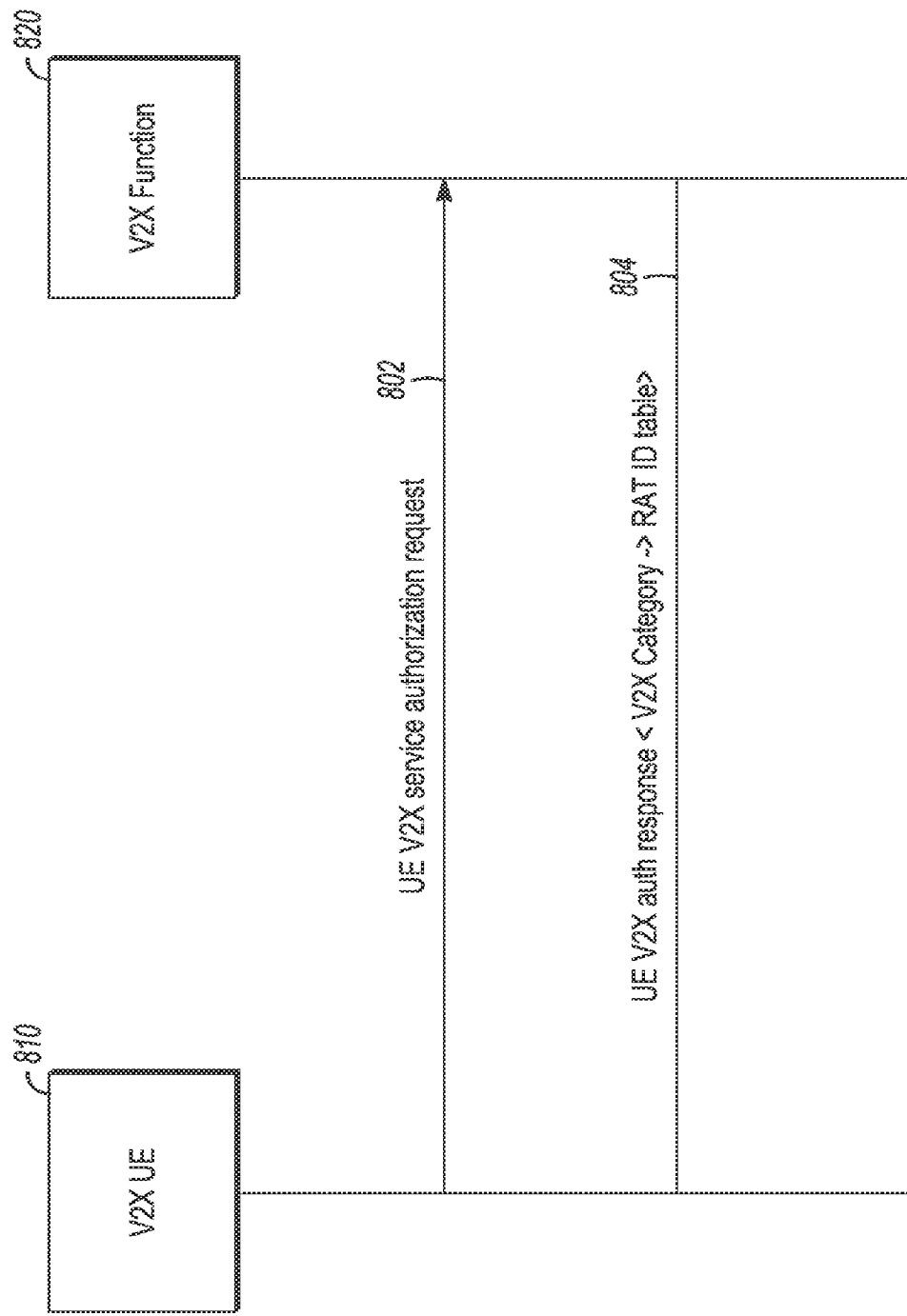
FIG. 8 illustrates mapping information communicated during service authorization in accordance with some embodiments.
Figures 13A, 13B:
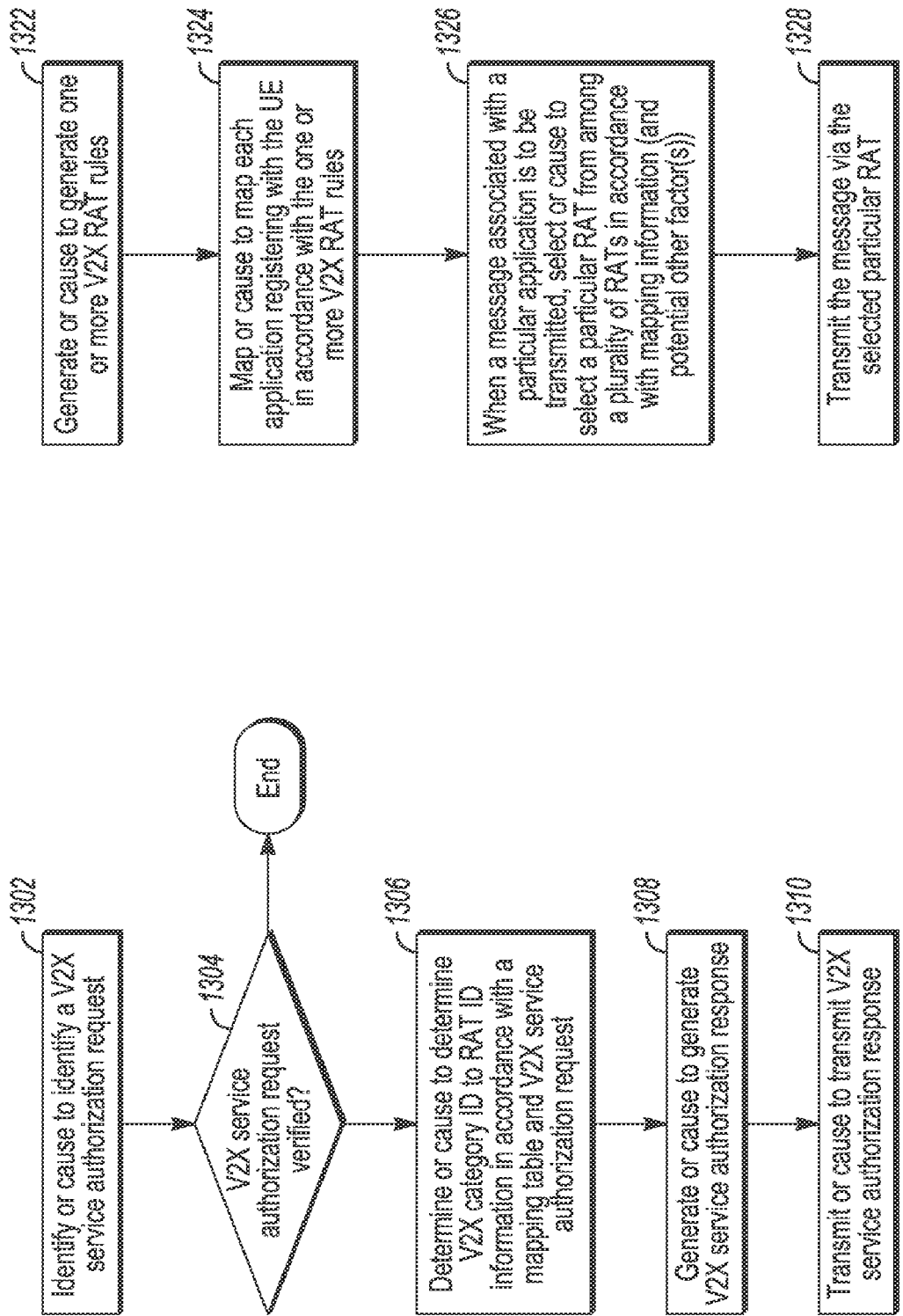
FIG. 13A illustrates a flowchart of V2X authentication in accordance with some embodiments.
FIG. 13B illustrates a flowchart of V2X application RAT determination in accordance with some embodiments.

FIG. 8 illustrates mapping information communicated during service authorization in accordance with some embodiments. The V2X U. 810 and the RAN (eNB, gNB) that contains the V2X function 820 may be shown in FIGS. 1-4. Note that although described throughout as the V2X function being in the RAN, in other embodiments, the V2X function may be provided in the core network (whether EPC or 5G CN), for example, in the MME. FIG. 13A illustrates a flowchart of V2X authentication in accordance with some embodiments and illustrating the operations involved in FIG. 8. Throughout FIG. 13A, the first verb (e.g., identify in operation 1302) relates to operations by the RAN and the second verb (e.g., cause to identify in operation 1302) relates to operations by the UE. V2X rules stored in the RAN may provide an operator-independent mapping between various V2X applications and preferred RAT.

The V2X UE 810 may attach to the RAN element containing the V2X function 820. The attach procedure may include, for example, registration and authentication initiated by transmission of an attach request from the V2X UE 810 to the RAN 820. As part of the attach procedure, the V2X UE 810 may transmit a V2X UE service authorization request 802 to the RAN element 820. At operation 1302, the V2X UE service authorization request 802 is identified by the RAN 820. In some embodiments, the service authorization request 802 may include a list of RATs supported by the V2X UE 810.

In response, at operation 1304 the V2X function 820 in the RAN 820 may verify the V2X service authorization request 802 from the V2X UE 810. The verification may be based on the subscription information stored in the home subscriber server (HSS) in the home network of the V2X UE 810. If the service authorization request 802 is not verified, the RAN 820 may terminate the process and may or may not additionally respond with a negative response.

Once the HSS verifies the UE subscription data and features supported, the V2X function 820 may at operation 1308 generate a V2X service authorization response 804. The V2X service authorization response 804 may have a status set to "V2X service authorized" to the V2X UE 810.

The V2X service authorization response 804 may also include the V2X category ID→RAT ID mapping table. If the V2X UE 810 included the list of RATs supported in the authorization request 802, then the V2X function 820 may limit the information in the V2X category ID→RAT ID mapping table at operation 1306 to only the RATs supported by the U E, as indicated by the authorization request message 802.

At operation 1310, the RAN may transmit the V2X service authorization response 804 to the V2X UE 810. The V2X UE 810 may thus receive the mapping information from the network during the V2X service authorization procedure. Both the complete mapping table and the modified mapping table (if the V2X UE provides the list of RATs).

In some embodiments, the V2X UE 810 may have an initial V2X category ID→RAT ID mapping table stored in memory prior to connection to the RAN 820. The initial V2X category ID→RAT ID mapping table, which may be the complete mapping table above, may be used as a default mapping table if one is not supplied in the authorization response 804. In some embodiments, the V2X category ID→RAT ID mapping table may be received only during authorization response 804. However, the V2X category ID→RAT ID mapping table is obtained, the V2X UE 810 may subsequently choose to transmit a message for a given application over the RAT based upon the mapping information maintained by the V2X UE 810. As above, the mapping may be operator-independent within a predetermined area;

that is, all operators (such as Verizon™ and AT&T™) may agree to use the same mapping so that each V2X UE 810 is able to communicate with each other V2X UE 810 using the same mapping.

This is unlike typical communications between a UE and eNB or UE to UE (D2D) communications, in which each operator to which a particular UE subscribes is able to establish a unique implementation of communication services (within the 3GPP specification), the mapping of applications to RAT may be local and operator-independent to establish interoperability between all V2X UEs. The geographic area of the mapping, likewise, may be agreed upon between the operators. In general, the mapping may essentially be of any size, although practically the mapping may be instantiated over a larger scale, such as country-wide, to avoid frequent transitions between mappings and reduce the control area. In various embodiments, the geographic area may be defined in terms of coverage of network equipment, such as multiple eNBs or one or more tracking areas of a particular operator, or as operators may have different coverage areas, the smallest coverage area of each network operator in that area.

In some embodiments, different communications may be used when the border between different mappings is reached. In particular, within a predefined range of the border, communications between V2X UEs may be transmitted on multiple RATs. In various embodiments, communications may be transmitted on each RAT, or all RATs on which a V2X UE is capable of transmission In some embodiments, only the communications of certain applications may be affected by the border. Various sets of application may be implemented that may be geographically-independent, that is the applications may map to the same RAT independent of area, with the geographically-independent applications being at least a subset of the application category that maps to that RAT. Examples of this may be applications that are determined to be pan of a basic service, such as collision control and location-based determination or map downloads, which may always be communicated using LTE communications. Such applications may not be subject to the border transition adjustment and continue to only be transmitted using LTE communications. Similarly, applications such as platooning, which may be limited to 5G communications only, may not be subject to the border transition adjustment. Other applications, such as cruise control, which may be 5G-based to satisfy a non-limiting KPI, may communicate over multiple systems in this area. This permits communications between V2X UEs to continue until out of the border region. In some embodiments, the border region may be defined as several hundred yards to several miles.

Figure 9:
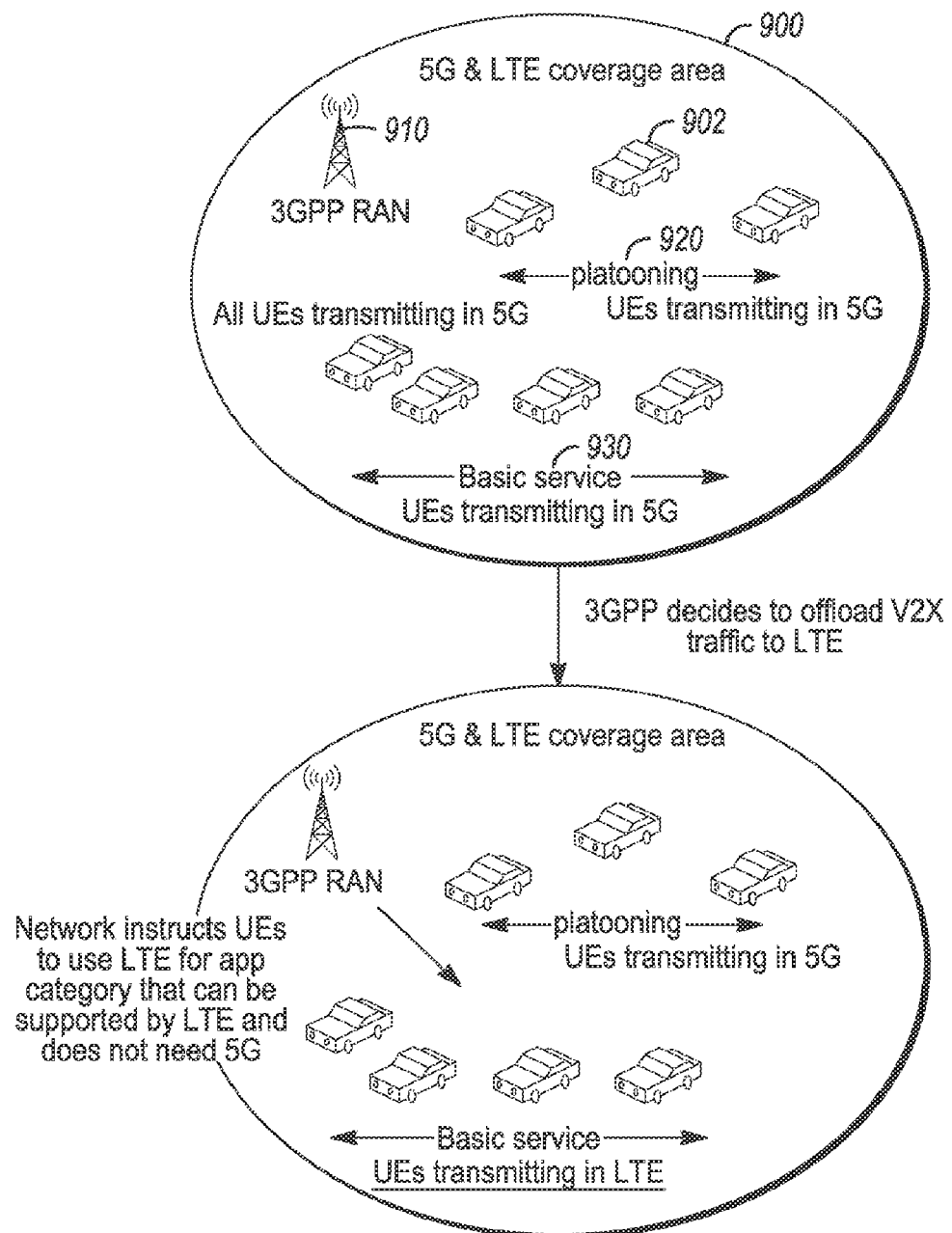
FIG. 9 illustrates a RAT transition in a V2X system in accordance with some embodiments.

FIG. 9 illustrates a RAT transition in a V2X system in accordance with some embodiments. The system 900 may contain one or more V2X UEs 902 in communication with the network through a 3GPP RAN 910 and perhaps with one or more of the other V2X UEs 902 through D2D communication, whether or not network assisted. Although not shown, the V2X UEs may also communicate with one or more road side units (RSU), which may be disposed in traffic signs or signals, lampposts, or other permanent fixtures within short-range communication (e.g., several yards) of the road, and may communicate with the network. As shown, some of the V2X UEs 902 may be platooning V2X UEs 920, in which the V2X UEs 902 move together with minimal change in the separation between the V2X UEs 902, while others of the V2X UEs 902 may be basic service V2X UEs 930 that receive basic service from the RAN 910.

The platooning V2X UEs 920 may communicate amongst themselves in V2D communications. Thus, data of a particular application category may be communicated among the platooning V2X UEs 920 using the same RAT, which as indicated in FIG. 9 are 5G communications. The platoon-related messages may be transmitted by the V2X UEs using 5G technology, as the latency requirements are very low and only supported in 5G.

In the embodiment shown in FIG. 9, both 5G and LTE services are available from the RAN 910, but the V2X IEs 902 may select the 5G system for transmission of data of the particular application as indicated by the V2X category ID→RAT ID mapping table. The RAIN 910 may be provided with an indication of which V2X IEs 902 are basic service V2X IEs 930 and which V2X UEs 902 are platooning V2X UEs 920. This information may be provided by a coordinating V2X UE 902 of the platooning V2X UEs 920 or may be determined by the network (e.g., RAN 910) based on velocity of the different platooning V2X UEs 920, distance from other platooning V2X UEs 920 and perhaps other information, such as applications jointly operational on the platooning V2X UEs 920.

The V2X UEs 920 may periodically (or aperiodically in some cases) report measurements, such as channel state information (CST), based reference signals (RS), such as CSI-RS. The RAN 1020 may use the report to determine, for example, whether handover to a different RAN 1010 is to occur. In some situations, the RAN 910 may decide that data from the particular application is not free to use any type of network and is instead constrained to LTE subcarriers. There may be a number of reasons for this determination, for example, congestion in the network in the 5G frequencies used by the RAN 910. In some embodiments, the RAN 910 may determine that the basic service V2X UEs 930 are to communicate specific application data that previously used 5G subcarriers on LTE subcarriers, and send instructions to the basic service V2X UEs 930 to switch data for the specific application (or application category in the V2X category ID→RAT ID mapping table) to using the LTE subcarriers. The RAN 910 may determine that other application category data of the basic service V2X UEs 930 may continue to use 5G subcarriers, and thus the instructions to the basic service V2X UEs 930 may be limited to one or more application categories. Similarly, the RAN 910 may recognize that the platooning V2X UEs 920 may not be able to switch to LTE subcarriers—for example, due to one or more members of the platooning V2X UEs 920 being unable to communicate using the LTE subcarriers. Thus, the instructions may be directed only to the basic service V2X UEs 930. The instructions may be transmitted, for example, in a system information broadcast, physical downlink control channel (PDCCH) or paging message addressed to particular V2X UEs 902 (e.g., using a particular DCI and/or RNTI).

Figure 10:
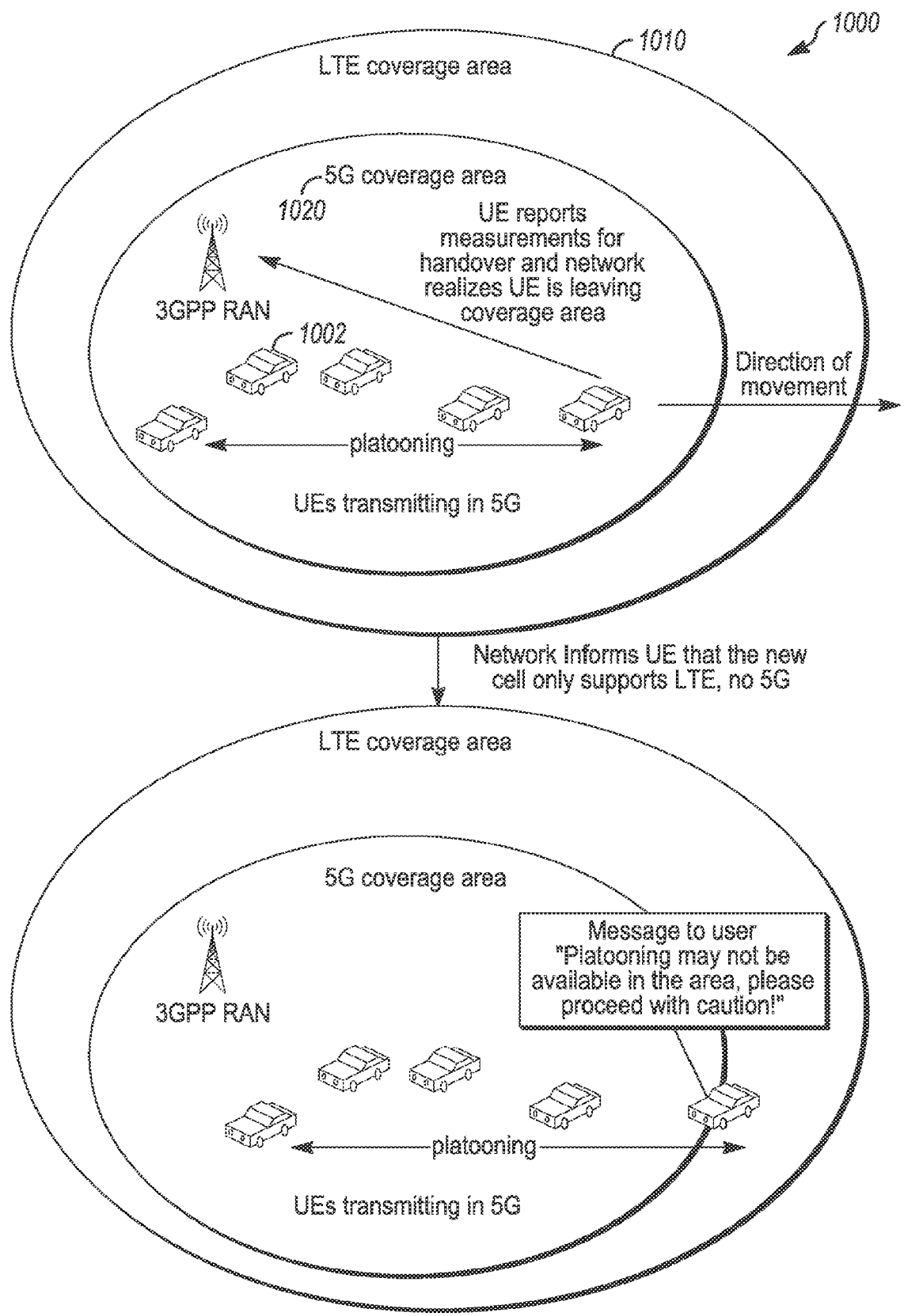
FIG. 10 illustrates another RAT transition in a V2X system in accordance with some embodiments.

FIG. 10 illustrates another RAT transition in a V2X system in accordance with some embodiments. The system 1000 is similar to that shown in FIG. 9, except that only platooning V2X UEs 1002 are shown. The platooning V2X UEs 1002 may all travel with about the same velocity—in the same direction at about the same speed. As shown, the platooning V2X UEs 1002 are initially in the 5G coverage area 1020 provided by the RAN. Data of an application category of the platooning V2X UEs 1002 may be communicated using the 5G subcarriers as all of the platooning V2X UEs 1002 are in the 5G coverage area 1020. Each of the platooning V2X UEs 1002 may also periodically transmit a measurement report to the RAN based on reference signals from the RAN. The serving eNB of the RAN may use the measurement report to determine whether handover to another eNB of the RAN is appropriate.

As shown in FIG. 10, the 5G RAN 1020 may determine that handover from the 5G RAN 1020 to another RAN is appropriate for one or more of the platooning V2X UEs 1002. The new RAN may be an LTE RAN 1010, which may not be able to support platooning due to the LTE latency requirements. Thus, because the platooning V2X UEs 1002 may communicate the data of the application category in 5G D2D communications, the platooning V2X UEs 1002 that are to undergo handover to the LTE RAN 1010 may no longer be able to communicate the application category in 5G D2D communications. In this case, the 5G RAN 1020 may transmit a message to the platooning V2X UEs 1002 that the 5G subcarriers are no longer available to communicate data of the application category. This message may be sent to all of the platooning V2X UEs 1002 or limited to only the platooning V2X UEs 1002 that are to undergo handover. The message may be transmitted prior to handover being performed. Each platooning V2X UE 1002 that has received the message may display an indication on a display within the platooning V2X U. 1002 warning that platooning may not be available. The platooning V2X UEs 1002 that exit the 5G coverage area 1020 may switch to basic service. The V2V messages to support a platooning application may be exchanged in the LTE cell 1020 using 5G "out of coverage" procedures. In some embodiments, all Vehicle-to-infrastructure (V2I) (to a RSU) and Vehicle-to-Network (V2N) messages (to an eNB) may be sent via LTE.

If a V2X UE is running an application that expects a QoS not supported by the technology provided by the current cell, the V2X UE may use out of service procedures for the given technology that supports the expected QoS, even though 3GPP coverage is provided in the cell by a different technology. In thus case, the UE may use different technologies to transfer data from the same application as a function of the type of message. In one example, V2V messages may be used in 5G and V2I/N messages may be used in LTE.

Although not show, another area may exist: that where no RAN (E-UTRAN or 5G) coverage is available. In this case, only direct V2V communication (also called direct Prose communication) may be possible. V2V communication may be LTE or 5G-based, each of which may have different protocols. Backwards compatibility may be desirable for 5G-based V2V communication to permit direct communication with older LTE-only V2X UEs.

Figure 11:
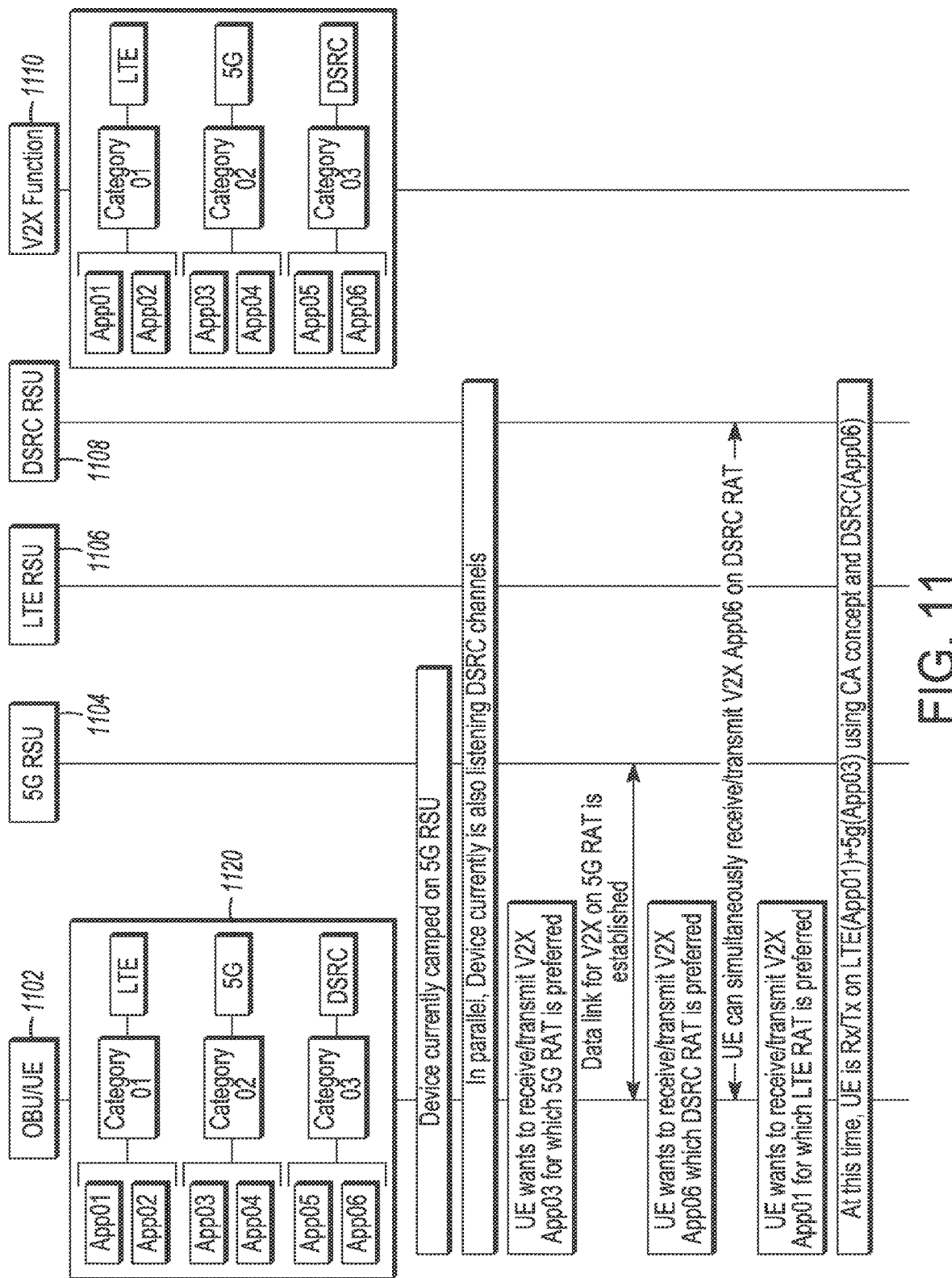
FIG. 11 illustrates a message sequence chart (MSC) diagram of a multi-RAT system in accordance with some embodiments.

FIG. 11 illustrates a message sequence chart (MSC) diagram of a multi-RAT system in accordance with some embodiments. FIG. 13B illustrates a flowchart of V2X application RAT determination in accordance with some embodiments and illustrating the operations involved in FIG. 11 (and FIG. 12) from both the UE and eNB side.

As above, the network may generate V2X rules as a mapping table at operation 1322 prior to receiving application information from the V2X UE 1102. The V2X rules may provide an operator-independent mapping between applications and preferred RAT. The communications may occur between the V2X UE 1102, RSUs of different RATs (shown as a 5G RSU 1104, LTE RSU 1106 and DSCR RSU 1108), and the V2X Function 1110, which may be disposed in the network as part of the RAN or CN. The RSUs may be local or network-based (e.g., eNBs).

Both the V2X UE 1102 and the V2X Function 1110 may each store a copy of the V2X category ID→RAT ID mapping table 1120. In some embodiments, the V2X category ID→RAT ID mapping table 1120 may be transmitted from the V2X Function 1110 to the V2X UE 1102 via OMA-DM. Each application that is registered with the V2X UE 1102 may at operation 1324 thus be mapped in accordance with the mapping table 1120.

In one embodiment shown in FIG. 11, for example, the V2X UE 1102 may be capable of carrier aggregation and may have established a data link with both the 5G RSU 1104 using the 5G RAT and the DSRC RSU 1108 using the DSRC RAT The V2X UE 1102 may initiate use of a first application (App03). The V2X UE 1102 may determine from the V2X category ID→RAT ID mapping table 1120 that App03 belongs to application category 2, for which use of the 5G RAT is preferred at operation 1326.

The V2X UE 1102 may then establish a data link for App03 with the 5G RSU 1104 using a first set of 5G subcarriers. Thus, at operation 1328 the V2X UE 1102 may communicate a message (data) via the selected RAT.

The V2X UE 1102 may initiate use of a second application (App06). The V2X UE 1102 may determine at operation 1326 from the V2X category ID→RAT ID mapping table 1120 that App06 belongs to application category 3, for which use of the DSRC RAT is preferred. The V2X UE 1102 then establishes a data link for App06 with the DSRC RSU 1108 using a first set of DSRC subcarriers. The V2X UE 1102 may communicate at operation 1328 the different application data simultaneously with the 5G RSU 1104 and the DSRC RSU 1108.

The V2X UE 1102 may subsequently initiate use of a third application (App01). The V2X UE 1102 may determine at operation 1326 from the V2X category ID→RAT ID mapping table 1120 that App01 belongs to application category 1, for which use of the LTE RAT is preferred. The V2X UE 1102 may discover and establish connection with the LTE RSU 1106 and establish a data link for App01 with the LTE RSU 1106 using a first set of LTE subcarriers. The V2X UE 1102 may use carrier aggregation to communicate with the 5G RSU 1104 and the LTE RSU 1106 and also communicate at operation 1328 separately with the DSRC RSU 1108.

Figure 12:
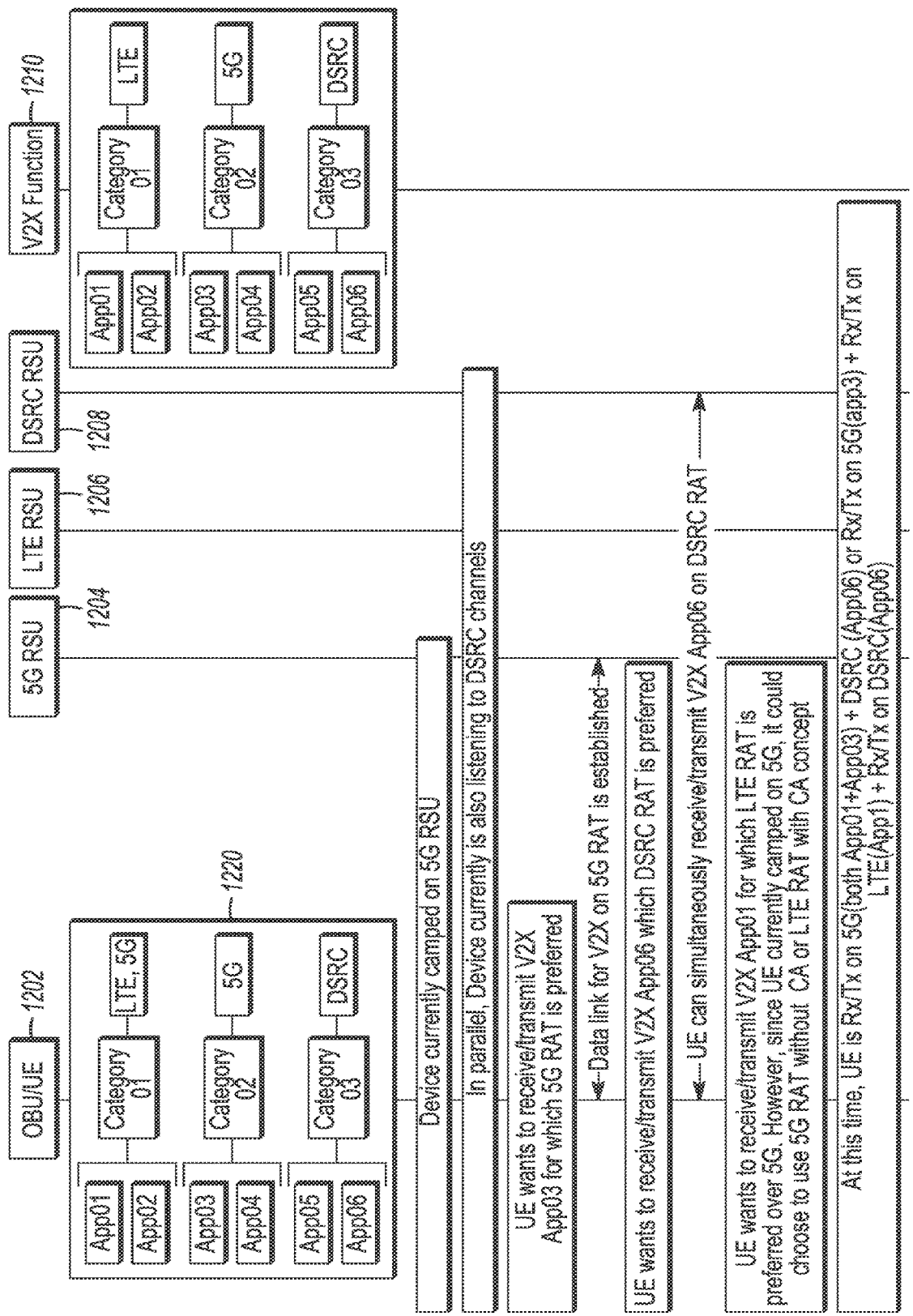
FIG. 12 illustrates another MSC diagram of a multi-RAT system in accordance with some embodiments.

FIG. 12 illustrates another MSC diagram of a multi-RAT system in accordance with some embodiments. As above, the communications may occur between the V2X UE 1202. RSUs of different RATs (shown as a 5G RSU 1204, LTE RSU 1206 and DSCR RSU 1208), and the V2X Function 1210, which may be disposed in the network as part of the RAN or CN. As above, both the V2X UE 1202 and the V2X Function 1210 may each store a copy of the V2X category ID→RAT ID mapping table 1220. In some embodiments, the V2X category ID→RAT ID mapping table 1220 may be transmitted from the V2X Function 1210 to the V2X UE 1202 via OMA-DM.

In FIG. 12, the V2X UE 1202 may be capable of carrier aggregation and may have established a data link with both the 5G RSJ 1204 using the 5G RAT and the DSRC RSU 1208 using the DSRC RAT. The V2X UE 1202 may initiate use of a first application (App03). The V2X UE 1202 may determine from the V2X category ID→RAT ID mapping table 1220 that App03 belongs to application category 2, for which use of the 5G RAT is preferred. The V2X UE 1202 then establishes a data link for App03 with the 5G RSU 1204 using a first set of 5G subcarriers.

The V2X UE 1202 may initiate use of a second application (App06). The V2X UE 1202 may determine from the V2X category ID→RAT ID mapping table 1220 that App06 belongs to application category 3, for which use of the DSRC RAT is preferred. The V2X UE 1202 then establishes a data link for App06 with the DSRC RSU 1208 using a first set of DSRC subcarriers. The V2X UE 1202 may communicate the different application data simultaneously with the 5G RSU 1204 and the DSRC RSU 1208.

The V2X UE 1202 may subsequently initiate use of a third application (App01). The V2X UE 1202 may determine from the V2X category ID→RAT ID mapping table 1220 that App01 belongs to application category 1, for which use of the LTE RAT is preferred. As the V2X UE 1202 is connected with the 5G RSU 1204, the V2X UE 1202 may select from among different options.

In some embodiments, even though the LTE RAT is preferred, the V2X UE 1202 may select the 5G RAT for communication of App01 data in response to being camped on the 5G RSU 1204. The selection may be based on the RSU(s) with which the V2X UE 1202 is currently attached and independent of whether the LTE RSU 1206 is available. In such embodiments, the V2X UE 1202 may use carrier aggregation to aggregate the App01 and App03 data on different 5G subcarriers and may use a separate transceiver and transmit/receive chain to communicate the App06 data on the DSRC subcarriers. In some embodiments, the V2X UE 1202, like other V2X UEs described herein, may thus be equipped with a multi-RAT modem (providing e.g., 5G, LTE and DSRC support). In various embodiments, like that or FIG. 11, the subcarriers used for each application may be separated and provided in different regions of the available 5G spectrum (i.e., blocks of spectrum allocated for the data of a single application, the blocks perhaps being separated by 5G or other spectrum) or may be interleaved such that adjacent 5G subcarriers may contain data of either application.

In other embodiments, the V2X UE 1202 may discover and establish connection with the LTE RSU 1206 and establish a data link for App01 with the LTE RSU 1206 using a First set of LTE subcarriers. The V2X UE 1202 may separately communicate with the 5G RSU 1204, the LTE RSU 1206 and the DSRC RSU 1208.

The selection of a particular RAT for the V2X UE to use for a particular application may be governed by one or more considerations involving various KPIs. Each KPI may be prioritized and operators can agree on a RAT selection policy based on any one or a combination of these parameters in different locations. If multiple KPIs for are used for different applications, the KPIs may be the same or different for each application, as may the KPI prioritization. The RAT selection policy may then be used to generate the V2X category ID→RAT ID mapping table.

One KPI on which RAT selection may be based may include network identification, such as a network identifier, channel and frequency. Based on network identification, either PLMN for 3GPP-based technologies or service set identifier (SSID), realm for Wi-Fi and other factors such as available bands/channel and appropriate radio technology may be selected in a particular location. In some embodiments, a selection based on this KPI may thus be purely location-based (i.e., which networks and resources are available) and has nothing to do with radio network characteristics.

A KPI may be the Received Signal Strength Indicator (RSSI) actual power of the received radio. This KPI may be relevant based on the speed of the vehicle and the intended destination. For example, a vehicle on a race course or more constrained location may use Wi-Fi or 802.11p based technology, whereas for larger scale coverage 3GPP technologies may be more desirable. This can also be decided based on received signal strength of a given technology within a cell.

Wireless link attachment and connection Failures and causes may be another KPI This is to say that one KPI may be network reliability. If there is too much interference, congestion or other factors may cause connections over a particular RAT to be unstable or drop frequently. This may result in the use of one RAT to be preferred over another RAT, depending on application requirements. Such statistics may be advertised by the operator for a given area or region.

Link speed such as achievable maximum bandwidth and throughput may be another KPI. This is to say that the achievable throughput in uplink and downlink directions may be a consideration based on the selected application. Examples of applications may include high definition (HD) maps, sharing of sensor data or large multimedia content.

Throughput bitrate variance as indicated according to signal and other conditions may be another KPI depending on application. For certain applications, like rich audio with video, a gaming application or camera data with roadside control station, a certain minimum throughput may be required with bounded variance.

Round trip time and latency may be a KPI for control signals and messages between vehicles and with infrastructure and other entities. Round trip time and latency may include application response time which measures the actual server response latency (e.g., hypertext transfer protocol (HTTP) response time). Another example of round trip time and latency may include network round trip time. The network round trip time may be measured through Internet Control Message Protocol (ICMP) requests. The network round trip time may be a consideration when communicating with entities deep inside the network. The round trip time can also be used to measure reachability, which may be measured counting the round trip time and success rate (%).

Range may also be used as a KPI. Range may measure the reachability and range of radio access technology based on the RAT type. For longer range, 3GPP technologies may be preferred.

In some embodiments, the selection of the RAT may be per application, which may be configured by the network or defined by the application when requesting the service. In some embodiments, the selection of the RAT may be per packet within an application. In this latter case, the RAT selection may be based on the V2X UE requesting the RAT or QoS at every packet transmission.

EXAMPLES

Example 1 is an apparatus of vehicle-to-anything (V2X) user equipment (V2X UE), the apparatus comprising: a memory; and processing circuitry in communication with the memory and arranged to: generate data of a V2X application for transmission to a road side unit (RSU); select, from a geographically-limited, operator-independent mapping table stored in the memory, a radio access technology (RAT) for the V2X application based on an application category of the V2X application, the mapping table comprising V2X applications grouped into V2X application categories, the V2X application categories based on fulfillment of different key performance indicators (KPIs); and encode the data for transmission to the RSU via the RAT.

In Example 2, the subject matter of Example 1 optionally includes wherein the mapping table provides a mapping between provider service identifiers (PSIDs) of the V2X applications to V2X application categories and an association between each V2X application category and an associated RAT.

In Example 3, the subject matter of any one or more of Examples 1-2 optionally include wherein: the mapping table provides interoperability, free from load balancing among a plurality of RATs, among V2X UEs.

In Example 4, the subject matter of any one or more of Examples 1-3 optionally include wherein the processing circuitry is further configured to: generate other data of another V2X application of a different application category, and encode the other data from the processing circuitry for simultaneous transmission of the data and other data to different RSUs on different RATs via carrier aggregation.

In Example 5, the subject matter of any one or more of Examples 1-4 optionally include wherein the processing circuitry is further configured to: generate other data of another V2X application of a different application category associated with a different RAT, determine that the V2X UE is camped on the RAT, and in response to a determination that the V2X UE is camped on the RAT, encode the other data from the processing circuitry for simultaneous transmission of the data and other data to a same RSU on a same RAT In Example 6, the subject matter of any one or more of Examples 1-5 optionally include wherein the processing circuitry is further configured to: attach to a radio access network (RAN) prior to generation of the data, attachment to the RAN comprising: generation by the processing circuitry of a V2X service authorization request for transmission to a V2X function in the RAN; and after transmission of the V2X service authorization request to the RAN, cause the memory to store the mapping table, the mapping table received in a V2X service authorization response from the RAN to the V2X UE.

In Example 7, the subject matter of Example 6 optionally includes wherein: the V2X service authorization request comprises a list of RATs supported by the V2X UE.

In Example 8, the subject matter of Example 7 optionally includes wherein, the mapping table is a modified version of a complete mapping table, the mapping table limited to the RATs supported by the V2X UE as indicated in the V2X service authorization request.

In Example 9, the subject matter of any one or more of Examples 1-8 optionally include wherein the processing circuitry is further configured to: generate a report for handover based on received reference signals, decode instructions in at least one of system information broadcast, physical downlink control channel (PDCCH) or paging message addressed to particular V2X UE in response to transmission of the report to the RAN, the instructions comprising instructions to change at least one of a plurality of application categories in the mapping table to use a different RAN, and in response to the instructions, indicate one or more applications of the at least one of the plurality of application categories to use the different RAN.

In Example 10, the subject matter of Example 9 optionally includes wherein: the instructions further comprise an indication that one or more other applications are unable to be used due to handover of the V2X UE, and the processing circuitry is further configured to generate a communication to a user of the V2X UE that the one or more other applications are unable to be used.

In Example 11, the subject matter of any one or more of Examples 1-10 optionally include wherein: the application category is associated with multiple prioritized RATs, the RATs comprising long term evolution (LTE), 5th generation mobile network (5G) and dedicated short range communication (DSRC).

In Example 12, the subject matter of any one or more of Examples 1-11 optionally include wherein: the KPI is selected from at least one of network identification, Received Signal Strength Indicator (RSSI), wireless link attachment and connection failures and causes, achievable maximum bandwidth, throughput bitrate variance, round trip time and latency, and range.

In Example 13, the subject matter of any one or more of Examples 1-12 optionally include wherein: selection of the RAT is on a packet-by-packet basis.

In Example 14, the subject matter of Example 13 optionally includes wherein, the RAT selection is dependent on the V2X UE requesting the RAT or a Quality of Service (QoS) at every packet transmission.

In Example 15, the subject matter of any one or more of Examples 1-14 optionally include wherein: the processing circuitry comprises a baseband processor, and the apparatus further comprises a transceiver configured to communicate with the other UE.

Example 16 is an apparatus of radio access network (RAN), the apparatus comprising: a memory configured to store a geographically-limited, operator-independent mapping table that maps a plurality of application categories to different preferred radio access technology (RAT), each application category comprising a grouping of at least one vehicle-to-anything (V2X) application; a V2X function; and processing circuitry in communication with the memory and arranged to: decode a V2X service authorization request from a V2X user equipment (UE), verify the V2X service authorization request through communication with a home subscriber server (HSS) in a home network of the V2X UE; in response to a positive verification of the V2X UE service authorization request, generate a V2X service authorization response comprising a V2X UE mapping table; and encode the V2X service authorization response.

In Example 17, the subject matter of Example 16 optionally includes wherein: the V2X service authorization request comprises a list of RATs supported by the V2X UE.

In Example 18, the subject matter of Example 17 optionally includes wherein the processing circuitry is further configured to: limit the RATs in the V2X UE mapping table to the RATs supported by the V2X UE as indicated in the V2X service authorization request to modify the mapping table and produce the V2X LIE mapping table.

In Example 19, the subject matter of any one or more of Examples 16-18 optionally include wherein: the mapping table provides a mapping between provider service identifiers (PSIDs) or the at least one V2X application to the V2X application categories and an association between each V2X application category and an associated RAT.

In Example 20, the subject matter of any one or more of Examples 16-19 optionally include wherein the processing circuitry is further configured to: generate reference signals for transmission to the V2X UE, in response to transmission of the reference signals to the V2X UE decode a report for handover based on the reference signals from the V2X UE, in response to a determination that handover to another RAN is appropriate, generate instructions in control signaling to the V2X UE, the instructions comprising instructions to change at least one of the application categories in the V2X mapping table to use a different RAN.

In Example 21, the subject matter of Example 20 optionally includes wherein, the instructions further comprise an indication that one or more other applications are unable to be used due to handover of the V2X UE.

In Example 22, the subject matter of any one or more of Examples 16-21 optionally include wherein: at least one of the application categories is associated with multiple RATs, and the processing circuitry is further configured to prioritized the RATs for each of the at least one of the application categories.

In Example 23, the subject matter of any one or more of Examples 16-22 optionally include wherein: selection of the RAT is on a packet-by-packet basis.

In Example 24, the subject matter of Example 23 optionally includes wherein: the RAT selection is dependent on the V2X UE requesting the RAT or a Quality of Service (QoS) at every packet transmission.

Example 25 is a computer-readable storage medium that stores instructions for execution by one or more processors of a vehicle user equipment (V2X UE), the one or more processors to configure the V2X UE to: receive a geographically-limited, operator-independent mapping table from a radio access network (RAN), the mapping table comprising a mapping between groups of V2X applications each associated with a different application category and a different radio access technology (RAT) for the V2X application category, each grouping of the V2X applications based on fulfillment of a key performance indicator (KPI) for the associated V2X application category; generate data of a V2X application for transmission to a road side unit (RSU), select a particular RAT based on the mapping table, and encode the data to the RSU via the particular RAT.

In Example 26, the subject matter of Example 25 optionally includes wherein: the mapping table is received in a V2X service authorization response from the RAN that is in response to a V2X service authorization request to the RAN to authorize the V2X UE, and in response to the V2X service authorization request comprising a list of RATs supported by the V2X UE, the mapping table is limited to the RATs supported by the V2X LE as indicated in the V2X service authorization request.

Example 27 is a method of radio access technology (RAT) selection in a vehicle user equipment (V2X UE), the method comprising: receiving a geographically-limited, operator-independent mapping table from a radio access network (RAN), the mapping table comprising a mapping between groups of V2X applications each associated with a different application category and a different RAT for the V2X application category, each grouping of the V2X applications based on fulfillment of a key performance indicator (KPI) for the associated V2X application category; generating data of a V2X application for transmission to a road side unit (RSU), selecting a particular RAT based on the mapping table; and transmitting the data to the RSU via the particular RAT.

In Example 28, the subject matter of Example 27 optionally includes wherein: the mapping table is received in a V2X service authorization response from the RAN that is in response to a V2X service authorization request to the RAN to authorize the V2X UE, and in response to the V2X service authorization request comprising a list of RATs supported by the V2X UE, the mapping table is limited to the RATs supported by the V2X UE as indicated in the V2X service authorization request.

Example 29 is an apparatus of a vehicle user equipment (V2X UE), the apparatus comprising: means for receiving a geographically-limited, operator-independent mapping table from a radio access network (RAN), the mapping table comprising a mapping between groups of V2X applications each associated with a different application category and a different radio access technology (RAT) for the V2X application category, each grouping of the V2X applications based on fulfillment of a key performance indicator (KPI) for the associated V2X application category; means for generating data of a V2X application for transmission to a road side unit (RSU); means for selecting a particular RAT based on the mapping table, and means for transmitting the data to the RSU via the particular RAT.

In Example 30, the subject matter of Example 29 optionally includes wherein, the mapping table is received in a V2X service authorization response from the RAN that is in response to a V2X service authorization request to the RAN to authorize the V2X UE, and in response to the V2X service authorization request comprising a list of RATs supported by the V2X LIE, the mapping table is limited to the RATs supported by the V2X UE as indicated in the V2X service authorization request.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A," and "A and B," unless otherwise indicated. In this document, the terms "including" and "in which" are used as the plain-English equivalents of the respective terms "comprising" and "wherein" Also, in the following claims, the terms "including" and "comprising" are open-ended, that is, a system. UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
at least one processor configured to cause a radio access network (RAN) element to:
receive, from a vehicle-to-anything (V2X) user equipment (UE), a request for V2X service authorization;
generate an authorization response including a mapping of a plurality of V2X application categories to V2X radio access technologies (RATs), wherein association of a V2X application with a V2X application category of the plurality of V2X application categories is based on a provider service identifier (PSID) associated with the V2X application; and
transmit, to the V2X UE, the authorization response;
generate reference signals for transmission to the V2X UE;
receive, in response to transmission of the reference signals to the V2X UE, a report for handover based on the reference signals from the V2X UE; and
generate, in response to a determination that handover to another RAN is appropriate, instructions in control signaling to the V2X UE, wherein the instructions instruct the RAN element to change at least one of the plurality of application categories in the mapping of the plurality of V2X application categories to V2X RATs to use a different RAN, and wherein the instructions comprise an indication that one or more other applications are unable to be used due to handover of the V2X UE.

2. The apparatus of claim 1, wherein:
the request for V2x service authorization comprises a list of radio access technologies (RATs) supported by the V2X UE.

3. The apparatus of claim 2, wherein the mapping of the plurality of V2X application categories to V2X RATs is limited to the list of RATs supported by the V2X UE.

4. The apparatus of claim 1, wherein:
at least one of the plurality of application categories is associated with multiple RATs, and
the at least one processor is further configured to cause the RAN element to prioritize the RATs for each of the at least one application categories.

5. The apparatus of claim 1, wherein:
the mapping maps PSIDs of V2X applications to V2X application categories and respective associations between V2X application categories and associated RATs.

6. The apparatus of claim 1, wherein:
the mapping provides interoperability, free from load balancing among a plurality of RATs, among V2X UEs.

7. A radio access network (RAN) element, comprising:
wireless communication circuitry; and
at least one processor operably coupled to the wireless communication circuitry and configured to cause the RAN element to:
receive, from a vehicle-to-anything (V2X) user equipment (UE), a request for V2X service authorization;
generate an authorization response including a mapping of a plurality of V2X application categories to V2X radio access technologies (RATs), wherein association of a V2X application with a V2X application category of the plurality of V2X application categories is based on a provider service identifier (PSID) associated with the V2X application;
transmit, to the V2X UE, the authorization response;
generate reference signals for transmission to the V2X UE;
receive, in response to transmission of the reference signals to the V2X UE, a report for handover based on the reference signals from the V2X UE; and
generate, in response to a determination that handover to another RAN is appropriate, instructions in control signaling to the V2X UE, wherein the instructions instruct the RAN element to change at least one of the plurality of application categories in the mapping of the plurality of V2X application categories to V2X RATs to use a different RAN, and wherein the instructions comprise an indication that one or more other applications are unable to be used due to handover of the V2X UE.

8. The RAN element of claim 7, wherein the request for V2x service authorization comprises a list of radio access technologies (RATs) supported by the V2X UE.

9. The RAN element of claim 8, wherein the mapping of the plurality of V2X application categories to V2X RATs is limited to the list of RATs supported by the V2X UE.

10. A non-transitory computer readable storage medium storing program instructions executable by one or more processors to cause a radio access network (RAN) element to:
receive, from a vehicle-to-anything (V2X) user equipment (UE), a request for V2X service authorization;
generate an authorization response including a mapping of a plurality of V2X application categories to V2X radio access technologies (RATs), wherein association of a V2X application with a V2X application category of the plurality of V2X application categories is based on a provider service identifier (PSID) associated with the V2X application;
transmit, to the V2X UE, the authorization response;
generate reference signals for transmission to the V2X UE;
receive, in response to transmission of the reference signals to the V2X UE, a report for handover based on the reference signals from the V2X UE; and
generate, in response to a determination that handover to another RAN is appropriate, instructions in control signaling to the V2X UE, wherein the instructions instruct the RAN element to change at least one of the plurality of application categories in the mapping of the plurality of V2X application categories to V2X RATs to use a different RAN, and wherein the instructions comprise an indication that one or more other applications are unable to be used due to handover of the V2X UE.

11. The non-transitory computer readable storage medium of claim 10, wherein the mapping maps PSIDs of V2X applications to V2X application categories and respective associations between V2X application categories and associated RATs.

12. The non-transitory computer readable storage medium of claim 10, wherein the mapping provides interoperability, free from load balancing among a plurality of RATs, among V2X UEs.

13. The non-transitory computer readable storage medium of claim 10, wherein the request for V2x service authorization comprises a list of radio access technologies (RATs) supported by the V2X UE.

14. The non-transitory computer readable storage medium of claim 13, wherein the mapping of the plurality of V2X application categories to V2X RATs is limited to the list of RATs supported by the V2X UE.

15. The non-transitory computer readable storage medium of claim 10, wherein:
   at least one of the plurality of V2X application categories is associated with multiple RATs; and
   the instructions are further executable to cause the RAN element to prioritize the RATs for each of the at least one V2X application categories.

16. The non-transitory computer readable storage medium of claim 10, wherein the at least one application category is associated with multiple prioritized RATs, wherein the multiple prioritized RATs comprising long term evolution (LTE), 5th generation mobile network (5G), and dedicated short range communication (DSRC) RATs.

17. The non-transitory computer readable storage medium of claim 10, wherein the plurality of V2X application categories are based on fulfillment of different key performance indicators (KPIs).

18. The non-transitory computer readable storage medium of claim 17, wherein the KPIs are selected from at least one of network identification, Received Signal Strength Indicator (RSSI), wireless link attachment and connection failures and causes, achievable maximum bandwidth, throughput bitrate variance, round trip time and latency, and range.

19. The non-transitory computer readable storage medium of claim 10, wherein a grouping of the plurality of V2X applications based on fulfillment of a key performance indicator (KPI) for an associated V2X application category of the plurality of V2X application categories.

20. The non-transitory computer readable storage medium of claim 10, wherein at least one of the one or more processors is a baseband processor.

* * * * *